United States Patent
Yokomakura et al.

(10) Patent No.: US 10,321,469 B2
(45) Date of Patent: Jun. 11, 2019

(54) TERMINAL DEVICE, INTEGRATED CIRCUIT, AND RADIO COMMUNICATION METHOD

(71) Applicant: Sharp Kabushiki Kaisha, Sakai, Osaka (JP)

(72) Inventors: Kazunari Yokomakura, Sakai (JP); Shoichi Suzuki, Sakai (JP); Tatsushi Aiba, Sakai (JP); Hiroki Takahashi, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 35 days.

(21) Appl. No.: 15/310,498

(22) PCT Filed: May 14, 2015

(86) PCT No.: PCT/JP2015/063939
§ 371 (c)(1),
(2) Date: Nov. 11, 2016

(87) PCT Pub. No.: WO2015/174504
PCT Pub. Date: Nov. 19, 2015

(65) Prior Publication Data
US 2017/0086207 A1 Mar. 23, 2017

Related U.S. Application Data

(60) Provisional application No. 61/994,350, filed on May 16, 2014.

(51) Int. Cl.
*H04W 24/10* (2009.01)
*H04W 72/04* (2009.01)
(Continued)

(52) U.S. Cl.
CPC ......... *H04W 72/085* (2013.01); *H04W 24/10* (2013.01); *H04W 72/04* (2013.01); *H04W 72/042* (2013.01); *H04W 88/02* (2013.01)

(58) Field of Classification Search
None
See application file for complete search history.

(56) References Cited

U.S. PATENT DOCUMENTS

2012/0275398 A1    11/2012   Chen et al.
2016/0249243 A1*    8/2016   Kim ....................... H04B 17/24
2017/0188255 A1*    6/2017   Chandrasekhar ..... H04W 24/10

FOREIGN PATENT DOCUMENTS

WO    2012/045770 A1    4/2012

OTHER PUBLICATIONS

Samsung; "Discussion on CSI Feedback for eIMTA"; 3GPP TSG RAN WG1 Meeting #76bis; R1-141272; Mar. 31-Apr. 4, 2014; pp. 1-4.

(Continued)

*Primary Examiner* — Yaotang Wang
(74) *Attorney, Agent, or Firm* — Keating & Bennett, LLP

(57) ABSTRACT

A mobile station device (1) includes a measurement unit (1059) that performs interference measurement to calculate channel state information in a first subframe set or a second subframe set to which a channel state information reference resource belongs. A subframe which is valid as the channel state information reference resource and corresponding to report of periodic channel state information is decided based on first UL-DL configuration and third UL-DL configuration. A subframe which is valid as the channel state information reference resource and corresponding to report of aperiodic channel state information is decided based on second UL-DL configuration.

9 Claims, 20 Drawing Sheets

(51) Int. Cl.
*H04W 72/08* (2009.01)
*H04W 88/02* (2009.01)

(56) References Cited

OTHER PUBLICATIONS

Samsung; "CSI Feedback for TDD-FDD CA"; 3GPP TSG RAN WG1; Meeting #76bis; R1-141279; Mar. 31-Apr. 4, 2014; pp. 1-5.
Qualcomm Incorporated; "Remaining Details of CSI Measurement and Reporting in eIMTA"; 3GPP TSG RAN WG1; Meeting #76bis; R1-141434; Mar. 31-Apr. 4, 2014; pp. 1-6.
Texas Instruments; "Views on CSI Measurement for LTE TDD eIMTA"; 3GPP TSG RAN WG1; Meeting #76; R1-140530; Feb. 10-14, 2014; 5 pages.
"3rd Generation Partnership Project; Technical Specification Group Radio Access Network; Evolved Universal Terrestrial Radio Access (E-UTRA); Physical layer procedures (Release 11)", 3GPP TS 36.213 V11.2.0, Feb. 2013, pp. 1-173.
Ericsson et al., "Signalling support for dynamic TDD", 3GPP TSG-RAN WG1 #72, R1-130558, Jan. 28-Feb. 1, 2013, 3 pages.
Ericsson et al., "On standardization impact of TDD UL-DL adaptation", 3GPP TSG-RAN WG1 #69, R1-122016, May 21-25, 2012, pp. 1-3.

\* cited by examiner

FIG. 9

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | – (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | – (1) |
| 1 | 2 | 1, 2 |
| 1 | 4 | 1, 4 |
| 1 | 5 | 1, 2, 4, 5 |
| 2 | 2 | – (2) |
| 2 | 5 | 2, 5 |
| 3 | 3 | – (3) |
| 3 | 4 | 3, 4 |
| 3 | 5 | 3, 4, 5 |
| 4 | 4 | – (4) |
| 4 | 5 | 4, 5 |
| 5 | 5 | – (5) |
| 6 | 6 | – (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 22

| CQI INDEX | MODULATION | CODING RATIO × 1024 | EFFICIENCY |
|---|---|---|---|
| 0 | OUT OF RANGE | | |
| 1 | QPSK | 73 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

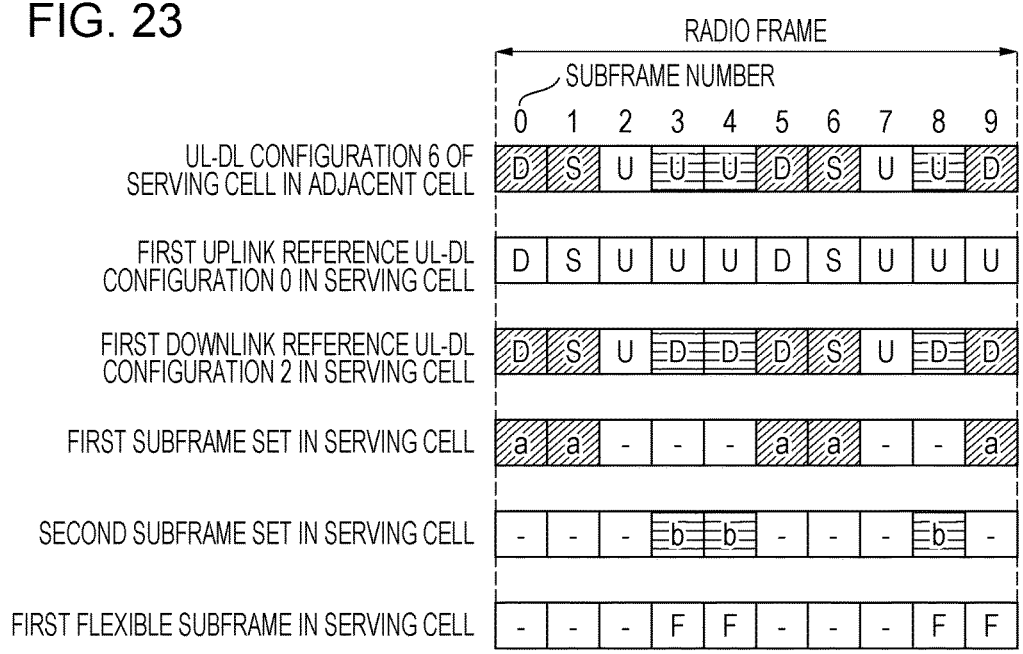

FIG. 25

| RADIO FRAME NUMBER | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| SUBFRAME SET | a | a | - | b | b | a | a | - | b | a | a | a | - | b | b | a | a | - | b | a |
| UPLINK REFERENCE UL-DL CONFIGURATION 0 | D | S | U | U | U | D | S | U | U | U | D | S | U | U | U | D | S | U | U | U |
| DOWNLINK REFERENCE UL-DL CONFIGURATION 2 | D | S | U | D | D | D | S | U | D | D | D | S | U | D | D | D | S | U | D | D |
| TRANSMISSION DIRECTION UL-DL CONFIGURATION 1 | D | S | U | U | D | D | S | U | U | D | NO VALID UL-DL CONFIGURATION | | | | | | | | | |
| CSI REQUEST | | | | | | | G | | | | | | | | | | | | | |
| APERIODIC CSI REPORT | | | | | | | | | | | | | | | A | | | | | |
| CSI REFERENCE RESOURCE | | | | | | | | | R | | | | | | | | | | | |

SUBFRAMES BEFORE 4 OR MORE SUBFRAMES FROM SUBFRAME WITH WHICH CSI IS REPORTED, AND AFTER SUBFRAME IN WHICH CSI REQUEST IS DETECTED OR SUBSEQUENT SUBFRAME

TERMINAL DEVICE, INTEGRATED CIRCUIT, AND RADIO COMMUNICATION METHOD

TECHNICAL FIELD

The present invention relates to a terminal device, an integrated circuit, and a radio communication method.

BACKGROUND ART

Radio access schemes and radio networks (hereinafter referred to as "Long Term Evolution (LTE)" or "Evolved Universal Terrestrial Radio Access (EUTRA)") of cellular mobile communication have been examined in 3rd Generation Partnership Project (3GPP). In LTE, a base station device is also referred to as an evolved NodeB (eNodeB) and a mobile station device is also referred to as user equipment (UE). LTE is a cellular communication system in which a plurality of areas covered by base station devices are arranged in cell shapes. A single base station device may manage a plurality of cells.

LTE corresponds to time division duplex (TDD). LTE adopting a TDD scheme is referred to as TD-LTE or LTE TDD. TDD is a technology for enabling full duplex communication in a single frequency band by performing time division multiplexing on an uplink signal and a downlink signal.

In 3GPP, a traffic adaptation technology and an interference reduction technology (DL-UL Interference Management and Traffic Adaptation) which are applied to TD-LTE has been examined. A traffic adaptation technology is a technology for changing ratios of uplink resources to downlink resources according to uplink traffics and downlink traffics. The traffic adaptation technology is also referred to as a dynamic TDD.

NPL 1 proposes a method of using flexible subframes as a method of realizing traffic adaptation. A base station device can transmit downlink signals or can receive uplink signals with flexible subframes. In NPL 1, a mobile station device regards flexible subframes as downlink subframes unless the mobile station device is instructed to transmit uplink signals in a flexible subframe by the base station device.

NPL 1 describes that a hybrid automatic repeat request (HARQ) timing corresponding to a physical downlink shared channel (PDSCH) is decided based on a newly introduced uplink-downlink configuration (UL-DL configuration) and an HARQ timing corresponding to a physical uplink shared channel (PUSCH) is decided based on a first UL-DL configuration.

NPL 2 describes that (a) an UL/DL Reference Configuration is introduced and (b) several subframes can be scheduled for either uplink or downlink in accordance with dynamic grant/assignment from a scheduler.

In NPL 3, section 7.2 describes a procedure of mobile station devices to report channel state information (CSI). A base station device allocates downlink resources to the mobile station devices based on the channel state information reported from the plurality of mobile station devices. The channel state information includes a channel quality indicator (CQI).

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21 to 25 May 2012.

NPL 2: "Signalling support for dynamic TDD", R1-130558, Ericsson, ST-Ericsson, 3GPP TSG-RAN WG1 Meeting #72, St Julian's, Malta, 28 Jan. to 1 Feb. 2013.

NPL 3: "3GPP TS36. 213 v11. 2.0 (2013 February)", 15th March February, 2013.

SUMMARY OF INVENTION

Technical Problem

In the foregoing radio communication systems, however, technologies for channel state information have not been sufficiently examined. The present invention has been devised in view of the foregoing circumstance and an object of the present invention is to provide a terminal device, an integrated circuit, and a radio communication method capable of efficiently performing communication in a radio communication system in which channel state information is used.

Solution to Problem (1) To achieve the foregoing object, according to an aspect of the present invention, there is provided a terminal device including: a reception unit that receives a signal of a higher layer including first information used to instruct two subframe sets and receives downlink control information including information for requesting report of channel state information regarding one subframe set of the two subframe sets; and a transmission unit that reports the channel state information derived with reference to a channel state information reference resource using subframe n. The channel state information reference resource is defined by one downlink subframe $n - n_{CQI\_ref}$ or one special subframe $n - n_{CQI\_ref}$ on a time domain. In a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received. In a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4. In a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe.

(2) According to another aspect of the present invention, there is provided a communication method for a terminal device. The method includes: receiving a signal of a higher layer including first information used to instruct two subframe sets and receiving downlink control information including information for requesting report of channel state information regarding one subframe set of the two subframe sets; and reporting the channel state information derived with reference to a channel state information reference resource using subframe n. The channel state information reference resource is defined by one downlink subframe $n - n_{CQI\_ref}$ or one special subframe $n - n_{CQI\_ref}$ on a time domain. In a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received. In a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4. In a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe.

(3) According to still another aspect of the present invention, there is provided an integrated circuit mounted on a terminal device and causing the terminal device to perform: a function of receiving a signal of a higher layer including first information used to instruct two subframe sets and receiving downlink control information including information for requesting report of channel state information regarding one subframe set of the two subframe sets; and a function of reporting the channel state information derived with reference to a channel state information reference resource using subframe n. The channel state information reference resource is defined by one downlink subframe n−$n_{CQI\_ref}$ or one special subframe n−$n_{CQI\_ref}$ on a time domain. In a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received. In a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4. In a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe.

Advantageous Effects of Invention

According to the present invention, a mobile station device and a base station device can efficiently perform communication in a radio communication system in which channel state information is used.

BRIEF DESCRIPTION OF DRAWINGS

FIG. 9 is a diagram illustrating an example of an uplink-downlink configuration in a table format according to the embodiment of the present invention.

FIG. 12 is a diagram illustrating correspondence between a pair formed by a configuration value of the first uplink reference UL-DL configuration in another serving cell (primary cell) and a configuration value of the first uplink reference UL-DL configuration in a serving cell (secondary cell), and a configuration value of a second uplink reference UL-DL configuration in the secondary cell according to the embodiment of the present invention.

FIG. 14 is a diagram illustrating correspondence between a pair formed by a configuration value of the first downlink reference UL-DL configuration in a primary cell and a configuration value of the first downlink reference UL-DL configuration in a secondary cell, and a configuration value of a second downlink reference UL-DL configuration in the secondary cell according to the embodiment of the present invention.

FIG. 15 is a diagram illustrating a relation between classification of a subframe designated in accordance with the first uplink reference UL-DL configuration and classification of a subframe designated in accordance with the first downlink reference UL-DL configuration according to the embodiment of the present invention.

FIG. 16 is a diagram illustrating a relation among classification of a subframe designated in accordance with the first uplink reference UL-DL configuration, classification of a subframe designated in accordance with the first downlink reference UL-DL configuration, and classification of a subframe designated in accordance with a transmission direction UL-DL configuration according to the embodiment of the present invention.

FIG. 17 is a diagram illustrating a relation among the first uplink reference UL-DL configuration, the first downlink reference UL-DL configuration, and the transmission direction UL-DL configuration according to the embodiment of the present invention.

FIG. 18 is a diagram illustrating correspondence between subframe n in which PDCCH/EPDCCH/PHICH is arranged and subframe n+k in which a PUSCH corresponding to PDCCH/EPDCCH/PHICH is arranged according to the embodiment of the present invention.

FIG. 19 is a diagram illustrating correspondence between subframe n in which a PHICH is arranged and subframe n−k in which a PUSCH corresponding to the PHICH is arranged according to the embodiment of the present invention.

FIG. 20 is a diagram illustrating correspondence between a subframe n in which a PUSCH is arranged and subframe n+k in which a PHICH corresponding to the PUSCH is arranged according to the embodiment of the present invention.

FIG. 21 is a diagram illustrating correspondence between subframe n−k in which a PDSCH is arranged and subframe n in which an HARQ-ACK corresponding to the PDSCH is transmitted according to the embodiment of the present invention.

FIG. 22 is a diagram illustrating modulation schemes and coding ratios corresponding to CQI indexes in a table format according to the embodiment of the present invention.

FIG. 23 is a diagram illustrating examples of the structures of subframe sets according to the embodiment of the present invention.

FIG. 24 is a diagram illustrating an arrangement example of a URS, a CRS, and control signals (PDCCH/PHICH/PCFICH) according to the embodiment of the present invention.

FIG. 25 is a diagram illustrating an arrangement example of the URS according to the embodiment of the present invention.

DESCRIPTION OF EMBODIMENTS

Hereinafter, an embodiment of a mobile station device and a radio communication method according to the present invention will be described.

In the embodiment, a plurality of cells are configured in a mobile station device. A technology for enabling a mobile station device to perform communication via a plurality of cells is referred to as cell aggregation or carrier aggregation. A mobile station device using a radio communication method according to the present invention in each of a plurality of cells configured in the mobile station device and a mobile station device using a radio communication method according to the present invention in some of a plurality of cells configured in the mobile station device are also included in the category of a terminal device according to the present invention.

A cell configured in a mobile station device is referred to as a serving cell. A plurality of configured serving cells include one primary cell and one secondary cell or a plurality of secondary cells. The primary cell is a serving cell in which an initial connection establishment procedure is performed, a serving cell in which connection re-establishment procedure starts, or a cell which is designated as a primary cell in a handover procedure. The secondary cell may be configured when or after RRC connection is established.

A Time Division Duplex (TDD) scheme is applied to a radio communication system according to the embodiment. In the case of cell aggregation, the TDD scheme may be applied to some or all of the plurality of cells. In the case of the cell aggregation, cells to which the TDD scheme is applied and cells to which a frequency division duplex (FDD) scheme is applied may be aggregated. In a case in which the cells to which the TDD is applied and the cells to which the FDD is applied are aggregated, the radio communication method according to the present invention can be applied to the cells to which the TDD is applied.

A mobile station device transmits information indicating a combination of bands in which carrier aggregation is supported by the mobile station device to a base station device. The mobile station device transmits information indicating whether simultaneous transmission and reception is supported in the plurality of serving cells in the plurality of different bands to the base station device in each combination of the bands.

In the embodiment, "X/Y" includes a meaning of "X or Y". In the embodiment, "X/Y" includes a meaning of "X and Y". In the embodiment, "X/Y" includes a meaning of "X and/or Y".

Figure 1:
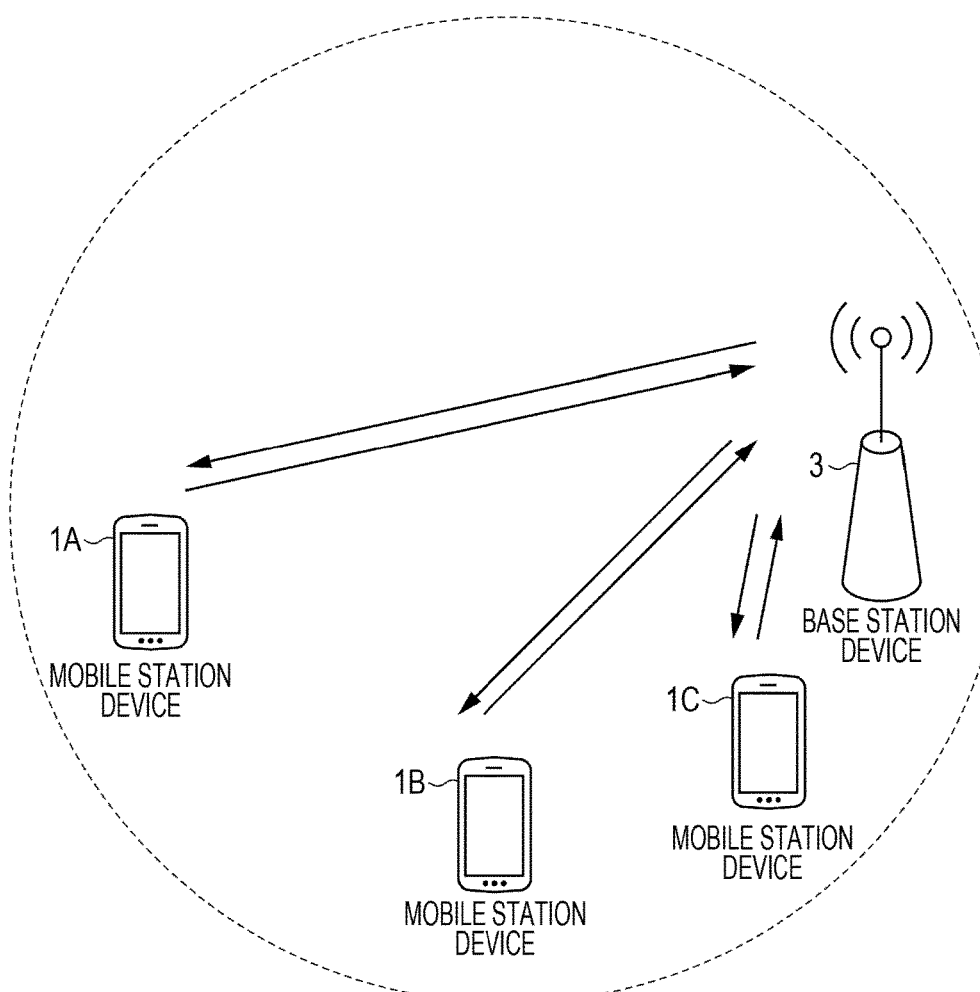
FIG. 1 is a conceptual diagram illustrating a radio communication system according to an embodiment of the present invention.

FIG. 1 is a conceptual diagram illustrating a radio communication system according to an embodiment of the present invention. In FIG. 1, the radio communication system includes mobile station devices 1A to 1C and a base station device 3. Hereinafter, the mobile station devices 1A to 1C are referred to as the mobile station devices 1.

Physical channels and physical signals according to the embodiment will be described.

In FIG. 1, the following uplink physical channels are used for uplink radio communication from the mobile station device 1 to the base station device 3. The uplink physical channels are used for the mobile station device 1 to transmit information output from a higher layer to the base station device 3:

Physical Uplink Control Channel (PUCCH);
Physical Uplink Shared Channel (PUSCH); and
Physical Random Access Channel (PRACH).

The PUCCH is a physical channel used for the mobile station device 1 to transmit uplink control information (UCI) to the base station device 3. The uplink control information includes channel state information (CSI) regarding downlink, a scheduling request (SR) indicating a request for PUSCH resources, and an acknowledgement (ACK)/negative-acknowledgement (NACK) (ACK/NACK) for downlink data (a transport block or a downlink-shared channel (DL-SCH)). The ACK/NACK is also referred to as an HARQ-ACK, an HARQ feedback, or response information.

The PUSCH is a physical channel that is used for the mobile station device 1 to transmit uplink data (an uplink-shared channel (UL-SCH)) to the base station device 3. The PUSCH may be used for the mobile station device 1 to transmit the HARQ-ACK and/or the channel state information along with the uplink data to the base station device 3. The PUSCH may be used for the mobile station device 1 to transmit only the channel state information or only the HARQ-ACK and the channel state information to the base station device 3.

The PRACH is a physical channel that is used for the mobile station device 1 to transmit a random access preamble to the base station device 3. The PRACH is an uplink physical channel that is mainly used for the mobile station device 1 to synchronize a time domain with the base station device 3. Besides, the PRACH is also used to indicate an initial connection establishment procedure, a handover procedure, a connection re-establishment procedure, synchronization (timing adjustment) of uplink transmission, and a request for PUSCH resources.

In FIG. 1, the following uplink physical signal is used for uplink radio communication. The uplink physical signal is not used to transmit information output form a higher layer, but is used for a physical layer:
  an uplink reference signal (UL RS).

In the embodiment, the following two types of uplink reference signals are used:
  a demodulation reference signal (DMRS); and
  a sounding reference signal (SRS).

The DMRS is an uplink reference signal that is related to transmission of the PUSCH or the PUCCH. The DMRS is subjected to time multiplexing along with the PUSCH or the PUCCH. For example, the base station device 3 uses the DMRS to correct a propagation path of the PUSCH or the PUCCH. Hereinafter, transmission of both the PUSCH and the DMRS is also simply referred to as transmission of the PUSCH. Hereinafter, transmission of both the PUCCH and the DMRS is also simply referred to as transmission of the PUCCH.

The SRS is an uplink reference signal that is not related to transmission of the PUSCH or the PUCCH. The base station device 3 uses the SRS to measure an uplink channel state. The mobile station device 1 transmits a first SRS with a first resource configured by a higher layer. Further, the mobile station device 1 transmits a second SRS with a second resource configured by a higher layer only once in a case in which information indicating a request for transmitting the SRS is received via the PDCCH. The first SRS is also referred to as a periodic SRS or a type 0 triggered SRS. The second SRS is also referred to as an aperiodic SRS or a type 1 triggered SRS. Transmission of the aperiodic SRS is scheduled by information indicating a request for transmitting the SRS.

In FIG. 1, the following downlink physical channels are used for downlink radio communication from the base station device 3 to the mobile station device 1. The downlink physical channels are used for the base station device 3 to transmit information output from a higher layer to the mobile station device 1;
  a physical broadcast channel (PBCH);
  a physical control format indicator channel (PCFICH);
  a physical hybrid automatic repeat request indicator channel (PHICH);
  a physical downlink control channel (PDCCH);
  an enhanced physical downlink control channel (EPDCCH);
  a physical downlink shared channel (PDSCH); and
  a physical multicast channel (PMCH).

The PBCH is used for the base station device 3 to report a master information block (MIB or a broadcast channel (BCH)) used commonly with the mobile station device 1 to the mobile station device 1. A transmission periodicity of the MIB is 40 ms and a retransmission periodicity of the MIB is 10 ms. Specifically, the MIB is initially transmitted with subframe 0 of a radio frame in which "SFN mod 4=0" is satisfied, and the MIB is retransmitted (repeated) with subframe 0 of all the other radio frames. A system frame number (SFN) is a radio frame number. The MIB is system information. For example, the MIB includes information indicating the SFN.

The PCFICH is used for the base station device 3 to transmit information for giving an instruction for a region (for example, OFDM symbols) used to transmit the PDCCH to the mobile station device 1.

The PHICH is used for the base station device 3 to transmit an HARQ indicator (an HARQ feedback or response information) indicating an ACK (ACKnowledgement) or a NACK (Negative ACKnowledgement) for uplink data (uplink shared channel (UL-SCH)) received by the base station device 3 to the mobile station device 1. For example, in a case in which the mobile station device 1 receives the HARQ indicator indicating the ACK, the mobile station device 1 does not retransmit corresponding uplink data. For example, in a case in which the mobile station device 1 receives the HARQ indicator indicating the NACK, the mobile station device 1 retransmits corresponding uplink data. The single PHICH is used for the base station device 3 to transmit the HARQ indicator for single uplink data. The base station device 3 transmits each of the HARQ indicators for a plurality of pieces of uplink data included in the same PUSCH using a plurality of PHICHs.

The PDCCH and the EPDCCH are used for the base station device 3 to transmit downlink control information (DCI) to the mobile station device 1. The downlink control information is also referred to as the DCI format. The downlink control information includes a downlink grant and an uplink grant. The downlink grant is also referred to as a downlink assignment or a downlink allocation.

The downlink grant is used to schedule transmission of a single PDSCH in a single cell. The downlink grant is used to schedule transmission of the PDSCH in the same subframe as a subframe with which the downlink grant is transmitted. The uplink grant is used to schedule transmission of a single PUSCH in a single cell. The uplink grant is used to schedule transmission of a single PUSCH in a subframe after 4 or more subframes from a subframe with which the uplink grant is transmitted.

A Cyclic Redundancy Check (CRC) parity bit is added to the DCI format. The CRC parity bit is scrambled by a cell-radio network temporary identifier (C-RNTI) or a semi persistent scheduling cell-radio network temporary identifier (SPS C-RNTI). The C-RNTI and the SPS C-RNTI are identifiers for identifying a mobile station device in a cell.

The C-RNTI is used to control the PDSCH or the PUSCH in a single subframe. The SPS C-RNTI is used to periodically allocate resources of the PDSCH or the PUSCH.

The PDSCH is used for the base station device 3 to transmit downlink data (a downlink shared channel (DL-SCH)) to the mobile station device 1.

The PMCH is used for the base station device 3 to transmit multicast data (a multicast channel (MCH)) to the mobile station device 1.

In FIG. 1, the following downlink physical signals are used for downlink radio communication. The downlink physical signals are not used to transmit information output from a higher layer, but are used by a physical layer;
  a synchronization signal (SS); and
  a downlink reference signal (DL RS)

The synchronization signals are used to synchronize a frequency domain and a time domain of downlink by the mobile station device 1. In the TDD scheme, synchronization signals are arranged in subframes 0, 1, 5, and 6 in a radio frame. In the FDD scheme, synchronization signals are arranged in subframes 0 and 5 in a radio frame.

The downlink reference signals are used to correct a propagation path of a downlink physical channel by the mobile station device 1. The downlink reference signals are used to calculate downlink channel state information by the mobile station device 1.

In the embodiment, the following 5 types of downlink reference signals are used by the mobile station device 1:
  a cell-specific reference signal (CRS);
  a UE-specific reference signal (URS) related to the PDSCH;

a demodulation reference signal (DMRS) related to the EPDCCH;

a non-zero power channel state information-reference signal (NZP CSI-RS);

a zero power channel state information reference signal (ZP CSI-RS);

a multimedia broadcast and multicast service over single frequency network reference signal (MBSFN RS); and a positioning reference signal (PRS)

The CRS is transmitted with all the bands of the subframes. The CRS is used to demodulate the PBCH/PDCCH/PHICH/PCFICH/PDSCH by the mobile station device 1. The CRS may be used for the mobile station device 1 to calculate downlink channel state information by the mobile station device 1. The PBCH/PDCCH/PHICH/PCFICH is transmitted with an antenna port used to transmit the CRS.

The URS related to the PDSCH is transmitted with a subframe and a band used to transmit the PDSCH to which the URS is related. The URS is used to demodulate the PDSCH to which the URS is related by the mobile station device 1.

The PDSCH is transmitted with an antenna port used to transmit the CRS or with an antenna port used to transmit the URS. DCI format 1A is used to schedule transmission of the PDSCH transmitted with the antenna port used to transmit the CRS. DCI format 2D is used to schedule transmission of the PDSCH transmitted with the antenna port used to transmit the URS.

The DMRS related to the EPDCCH is transported with a subframe and a band used to transmit the EPDCCH to which the DMRS is related. The DMRS is used to demodulate the EPDCCH to which the DMRS is related by the mobile station device 1. The EPDCCH is transmitted with an antenna port used to transmit the DMRS.

The NZP CSI-RS is transmitted with a configured subframe. Resources with which the NZP CSI-RS is transmitted are configured by the base station device. The NZP CSI-RS is used to calculate downlink channel state information by the mobile station device 1. The mobile station device 1 performs signal measurement (channel measurement) using the NZP CSI-RS.

The resources of the ZP CSI-RS are set by the base station device 3. The base station device 3 transmits the ZP CSI-RS by using a zero output. That is, the base station device 3 does not transmit the ZP CSI-RS. The base station device 3 does not transmit the PDSCH and the EPDCCH in the configured resources of the ZP CSI-RS. For example, the mobile station device 1 can measure interference in resources which correspond to the NZP CSI-RS of a certain cell.

The MBSFN RS is transmitted with all of the bands of the subframes used to transmit the PMCH. The MBSFN RS is used to demodulate the PMCH by the mobile station device 1. The PMCH is transmitted with an antenna port used to transmit the MBSFN RS.

The PRS is used to measure a geographic position of the own device by the mobile station device.

The downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the MCH, the UL-SCH, and the DL-SCH are transport channels. Channels used in a medium access control (MAC) layer are referred to as transport channels.

Units of the transport channels used in the MAC layer are referred to as transport blocks (TB) or MAC protocol data units (PDUs). For example, control of a hybrid automatic repeat request (HARQ) is performed for each transport block in the MAC layer. The transport blocks are units of data delivered from the MAC layer to the physical layer. In the physical layer, the transport block is mapped to a codeword and a coding process is performed for each codeword.

Hereinafter, the structure of a radio frame according to the embodiment will be described.

Figure 2:
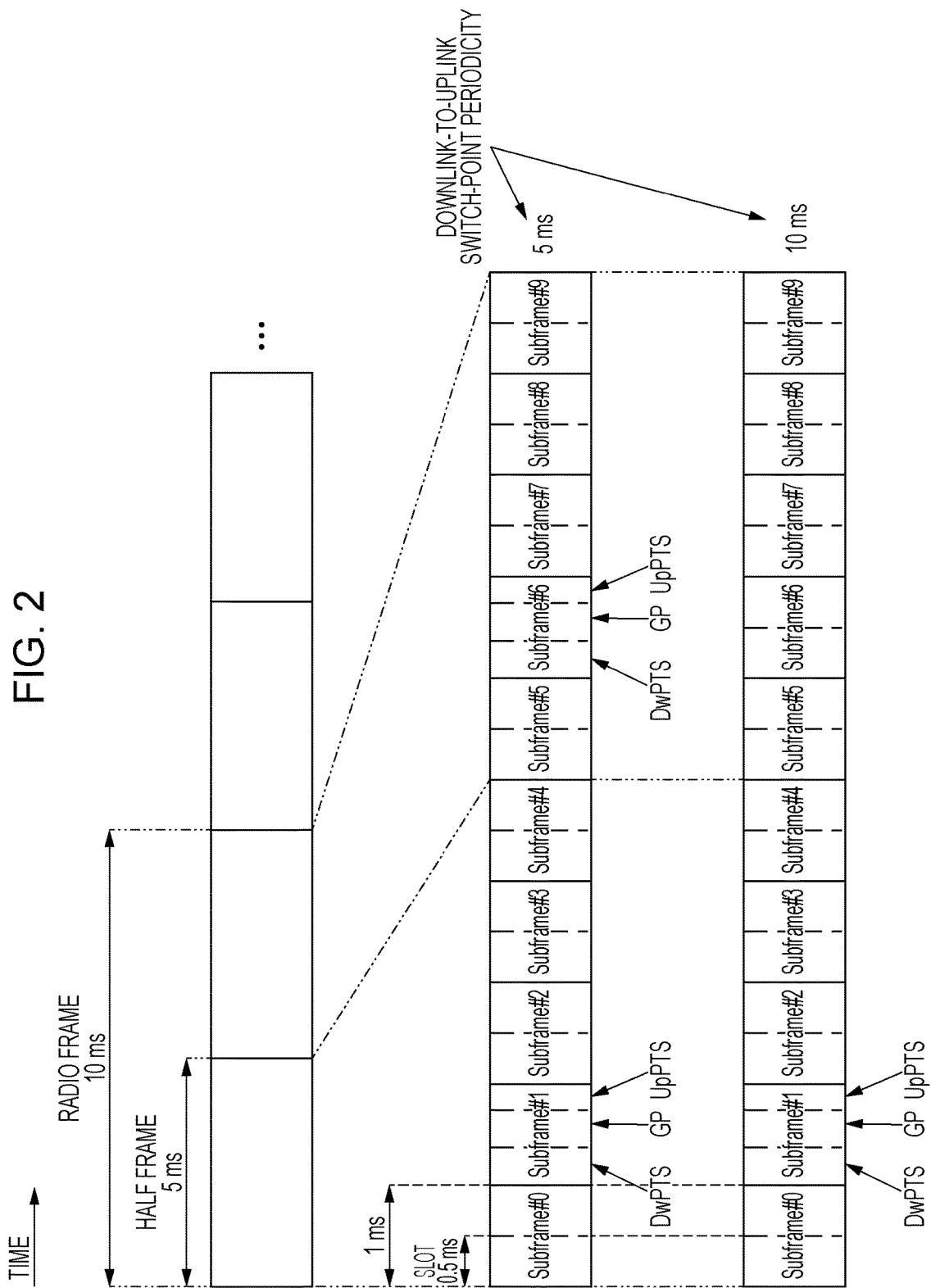
FIG. 2 is a diagram illustrating a schematic structure of a radio frame according to the embodiment of the present invention.

FIG. 2 is a diagram illustrating a schematic structure of a radio frame according to the embodiment. For example, each radio frame has a length of 10 ms. In FIG. 2, the horizontal axis is a time axis. Each radio frame is configured to include two half frames. Each half frame has a length of 5 ms. Each half frame is configured to include 5 subframes. Each subframe has a length of 1 ms and is defined by 2 continuous slots. Each slot has a length of 0.5 ms. An i-th subframe in the radio frame is configured to include a (2×i)-th slot and a (2×i+1)-th slot. That is, 10 subframes are used at intervals of 10 ms.

In the embodiment, the following three types of subframes are defined:

a downlink subframe (first subframe);

an uplink subframe (second subframe); and a special subframe (third subframe).

The downlink subframe is a subframe that is reserved for downlink transmission. The uplink subframe is a subframe that is reserved for uplink transmission. The special subframe is configured to three fields. The three fields are a downlink pilot time slot (DwPTS), a guard period (GP), and an uplink pilot time slot (UpPTS). The total length of the DwPTS, the GP, and the UpPTS is 1 ms. The DwPTS is a field that is reserved for downlink transmission. The UpPTS is a field that is reserved for uplink transmission. The GP is a field that is not used for downlink transmission and uplink transmission. The special subframe may be configured to include only the DwPTS and the GP or may be configured to include only the GP and the UpPTS.

The single radio frame is configured to include at least the downlink subframe, the uplink subframe, and the special subframe.

In the radio communication system according to the embodiment, downlink-to-uplink switch-point periodicities of 5 ms and 10 ms are supported. In a case in which the downlink-to-uplink switch-point periodicity is 5 ms, the special subframe is included in both of the half frames in the radio frame. In a case in which the downlink-to-uplink switch-point periodicity is 10 ms, the special subframe is included only in the first half frame in the radio frame.

Hereinafter, the structure of a slot according to the embodiment will be described.

Figure 3:
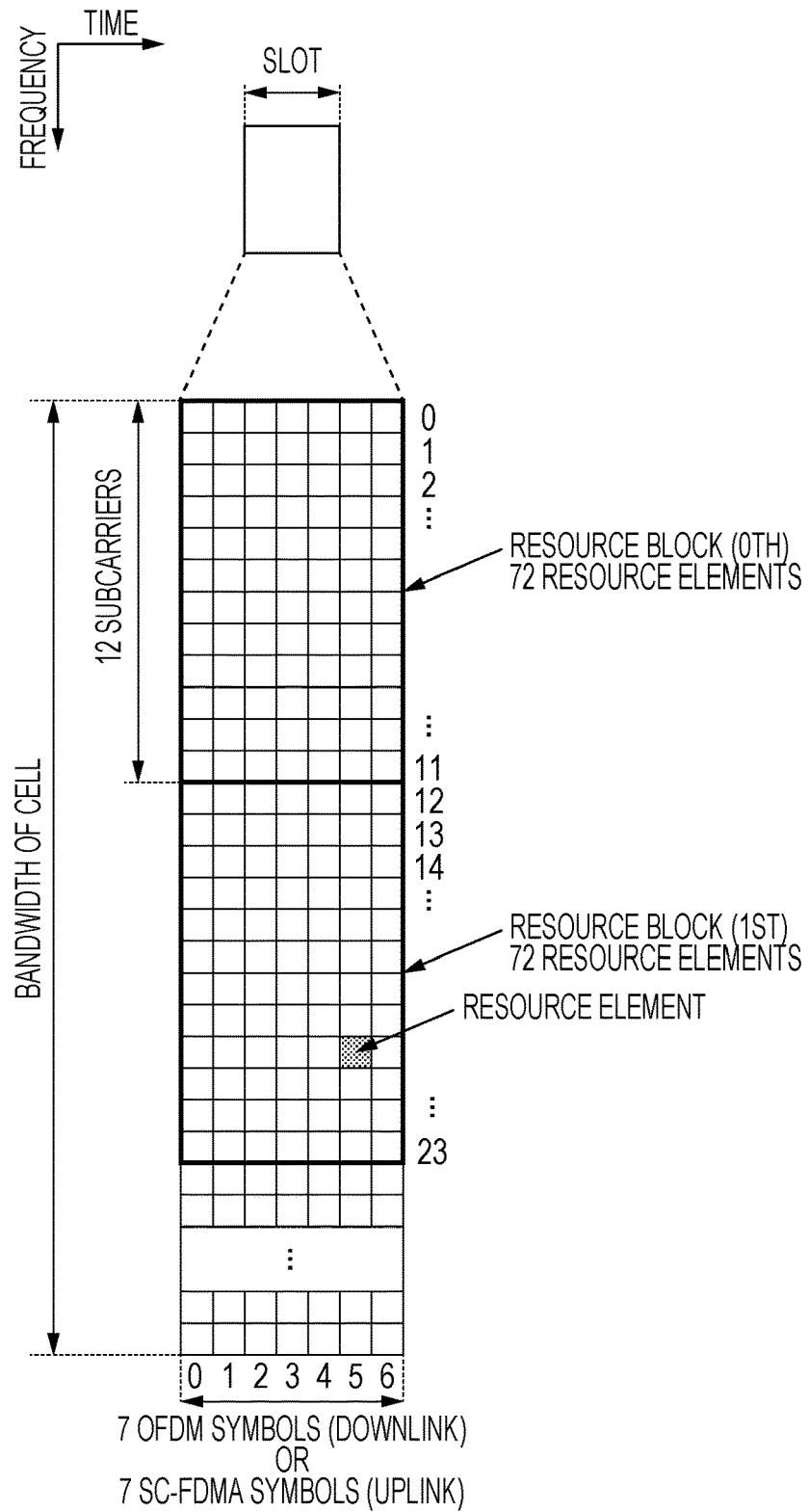
FIG. 3 is a diagram illustrating the structure of a slot according to the embodiment of the present invention.

FIG. 3 is a diagram illustrating an example of the structure of a slot according to the embodiment. In the embodiment, a normal cyclic prefix (CP) is applied to the OFDM symbol. An extended cyclic prefix (CP) may be applied to the OFDM symbol. The physical signals or the physical channels transmitted with each slot are expressed by a resource grid. In FIG. 3, the horizontal axis is a time axis and the vertical axis is a frequency axis. In a downlink, the resource grid is defined in accordance with a plurality of subcarriers and a plurality of OFDM symbols. In an uplink, the resource grid is defined in accordance with a plurality of subcarriers and a plurality of SC-FDMA symbols. The number of subcarriers included in one slot depends on the bandwidth of a cell. The number of OFDM symbols or SC-FDMA symbols included in one slot is 7. Each of the elements in the resource grid is referred to as a resource element. The resource element is identified using a subcarrier number and an OFDM symbol or SC-FDMA symbol number.

The resource block is used to express mapping to the resource element of a certain physical channel (the PDSCH, the PUSCH, or the like). As resource blocks, two types of virtual resource block and physical resource block are defined. A certain physical channel is first mapped to a virtual resource block. Thereafter, the virtual resource block is mapped to a physical resource block. One physical resource block is defined in accordance with 7 continuous OFDM symbols or SC-FDMA symbols in the time domain and 12 continuous subcarriers in the frequency domain. Therefore, one physical resource block is structured to include (7×12) resource elements. The size of one physical resource block in the time domain is a size (0.5 ms) corresponding to one slot and the size of one physical resource block in the frequency domain is 180 kHz. Resource block numbers (RB numbers) with the same values can be attached to the physical resource blocks in the same frequency bands. Specifically, a relatively lower RB number can be attached to a physical resource block with a relatively lower frequency band and 0 can be attached as an RB number to a physical resource block with the lowest frequency band.

Hereinafter, the physical channels and the physical signals transmitted in each subframe will be described.

Figure 4:
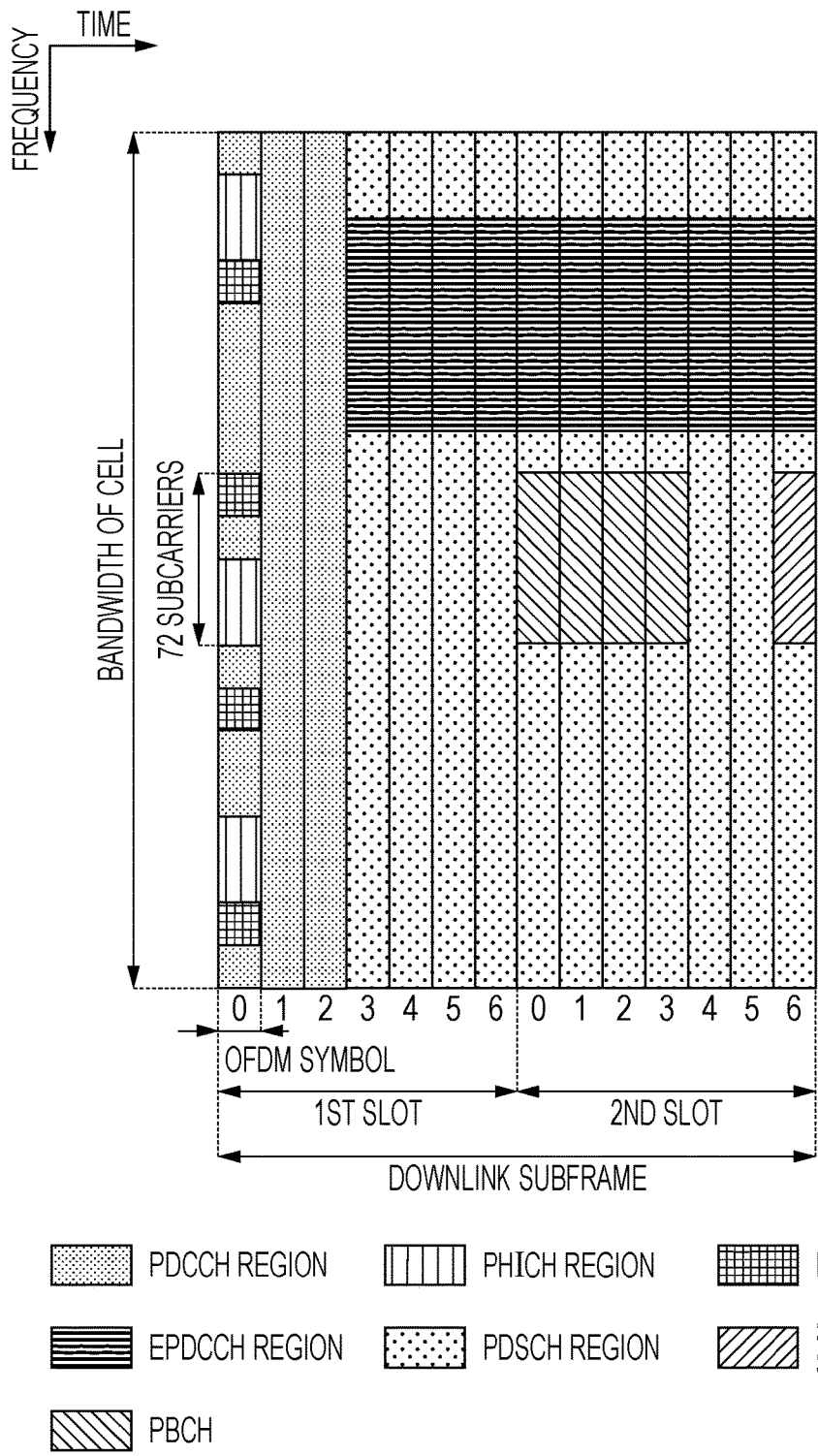
FIG. 4 is a diagram illustrating an arrangement example of physical channels and physical signals in a downlink subframe according to the embodiment of the present invention.

FIG. 4 is a diagram illustrating an arrangement example of physical channels and physical signals in a downlink subframe according to the embodiment. In FIG. 4, the horizontal axis is a time axis and the vertical axis is a frequency axis. The base station device 3 may transmit the downlink physical channels (the PBCH, the PCFICH, the PHICH, the PDCCH, the EPDCCH, and the PDSCH) and the downlink physical signals (synchronization signals and downlink reference signals) in a downlink subframe. The PBCH is transmitted only with subframe 0 in the radio frame. The downlink reference signals are arranged in the resource elements distributed in the frequency domain and the time domain. To facilitate the description, the downlink reference signals are not illustrated in FIG. 4.

In the PDCCH region, the plurality of PDCCHs may be subjected to frequency multiplexing and time multiplexing. In the EPDCCH region, the plurality of EPDCCHs may be subjected to frequency multiplexing, time multiplexing, and spatial multiplexing. In the PDSCH region, the plurality of PDSCHs may be subjected to frequency multiplexing and spatial multiplexing. The PDCCH may be subjected to time multiplexing and the PDSCH or the EPDCCH may be subjected to time multiplexing. The PDSCH and the EPDCCH may be frequency multiplexing.

Figure 5:
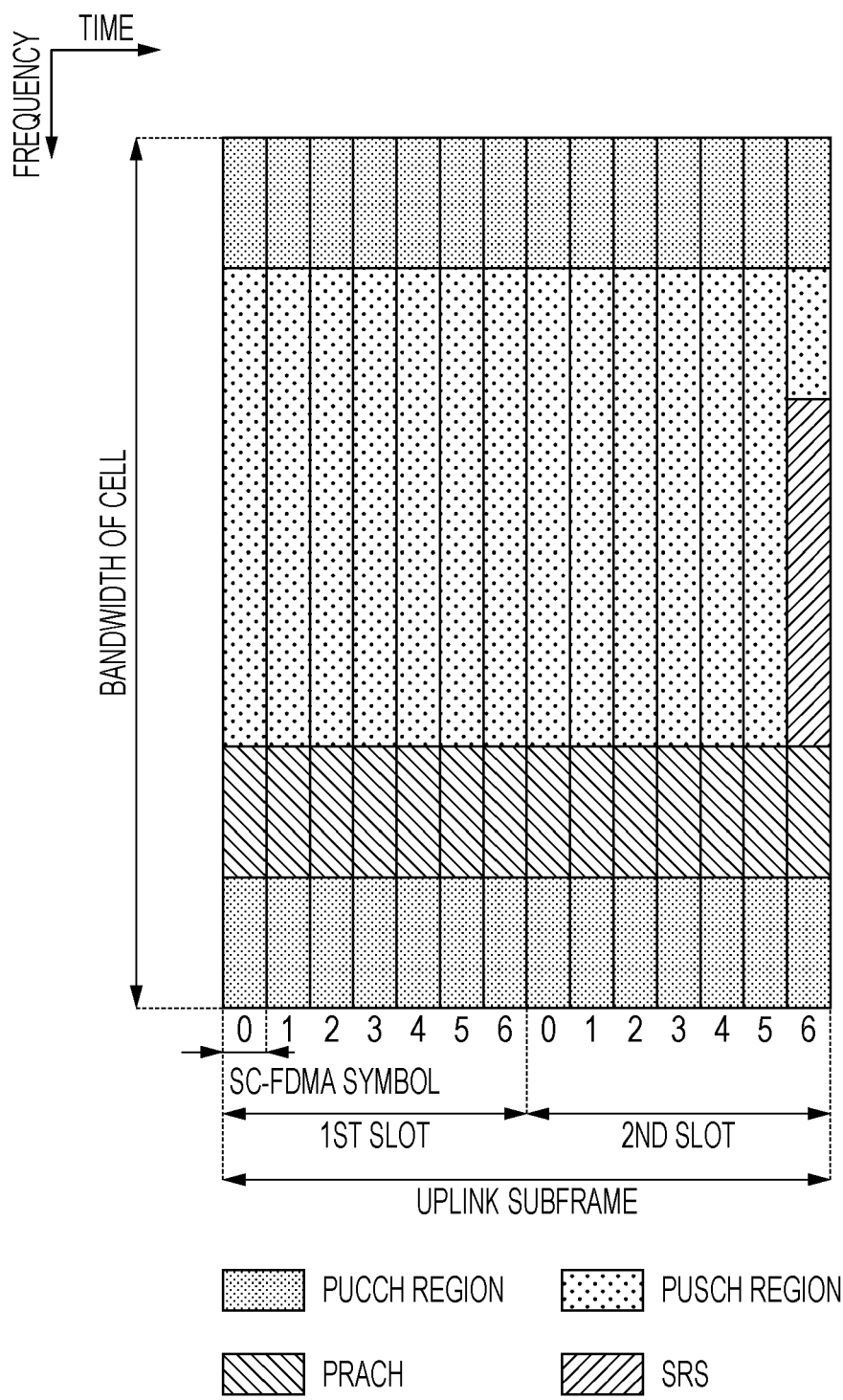
FIG. 5 is a diagram illustrating an arrangement example of physical channels and physical signals in an uplink subframe according to the embodiment of the present invention.

FIG. 5 is a diagram illustrating an arrangement example of physical channels and physical signals in an uplink subframe according to the embodiment. In FIG. 5, the horizontal axis is a time axis and the vertical axis is a frequency axis. The mobile station device 1 may transmit the uplink physical channels (the PUCCH, the PUSCH, and the PRACH) and uplink physical signals (the DMRS and the SRS) in an uplink subframe. For example, in the PUCCH region, the plurality of PUCCHs are subjected to frequency multiplexing, time multiplexing, and code multiplexing. In the PUSCH region, the plurality of PUSCH may be subjected to the frequency multiplexing and spatial multiplexing. The PUCCH and the PUSCH may be subjected to the frequency multiplexing. The PRACH may be arranged at a single subframe or two subframes. The plurality of PRACHs may be subjected to code multiplexing.

The SRS is transmitted using the final SC-FDMA symbol of the uplink subframe. That is, the SRS is arranged at the final SC-FDMA symbol in the uplink subframe. The mobile station device 1 is not able to simultaneously transmit the SRS and the PUCCH/PUSCH/PRACH using the single SC-FDMA symbol in a single cell. The mobile station device 1 is able to transmit the PUSCH and/or the PUCCH using each SC-FDMA symbol excluding the final SC-FDMA symbol in the uplink subframe of the single cell and is able to transmit the SRS using the final SC-FDMA symbol in the uplink subframe with the uplink subframe. That is, the mobile station device 1 can transmit both of the SRS and the PUSCH/PUCCH in the single uplink subframe of the single cell. The DMRS is subjected to the time multiplexing along with the PUCCH or the PUSCH. Here, to facilitate the description, the DMRS is not illustrated in FIG. 5.

Figure 6:
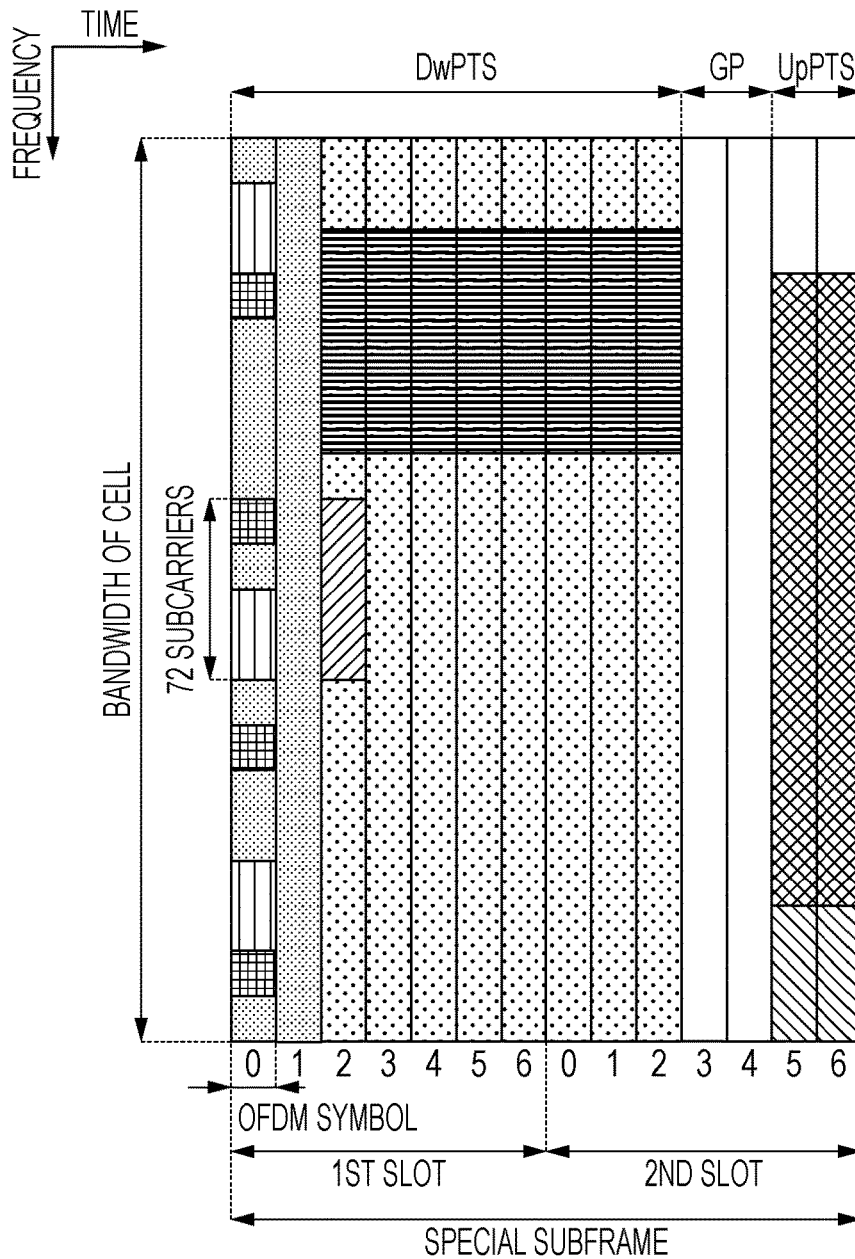
FIG. 6 is a diagram illustrating an arrangement example of physical channels and physical signals in a special subframe according to the embodiment of the present invention.

FIG. 6 is a diagram illustrating an arrangement example of physical channels and physical signals in a special subframe according to the embodiment. In FIG. 6, the horizontal axis is a time axis and the vertical axis is a frequency axis. In FIG. 6, the DwPTS is structured to include the 1st to 10th ten SC-FDMA symbols in the special subframe. The GP is structured to include the 11th SC-FDMA symbol and the 12th SC-FDMA symbol in the special subframe. The UpPTS is structured to include the 13th SC-FDMA symbol and the 14th SC-FDMA symbols in the special subframe.

The base station device 3 may transmit the PCFICH, the PHICH, the PDCCH, the EPDCCH, the PDSCH, a synchronization signal, and a downlink reference signal in the DwPTS of the special subframe. The base station device 3 does not transmit the PBCH in the DwPTS of the special subframe. The mobile station device 1 may transmit the PRACH and the SRS in the UpPTS of the special subframe. That this, the mobile station device 1 does not transmit the PUCCH, the PUSCH, and the DMRS in the UpPTS of the special subframe.

Figure 7:
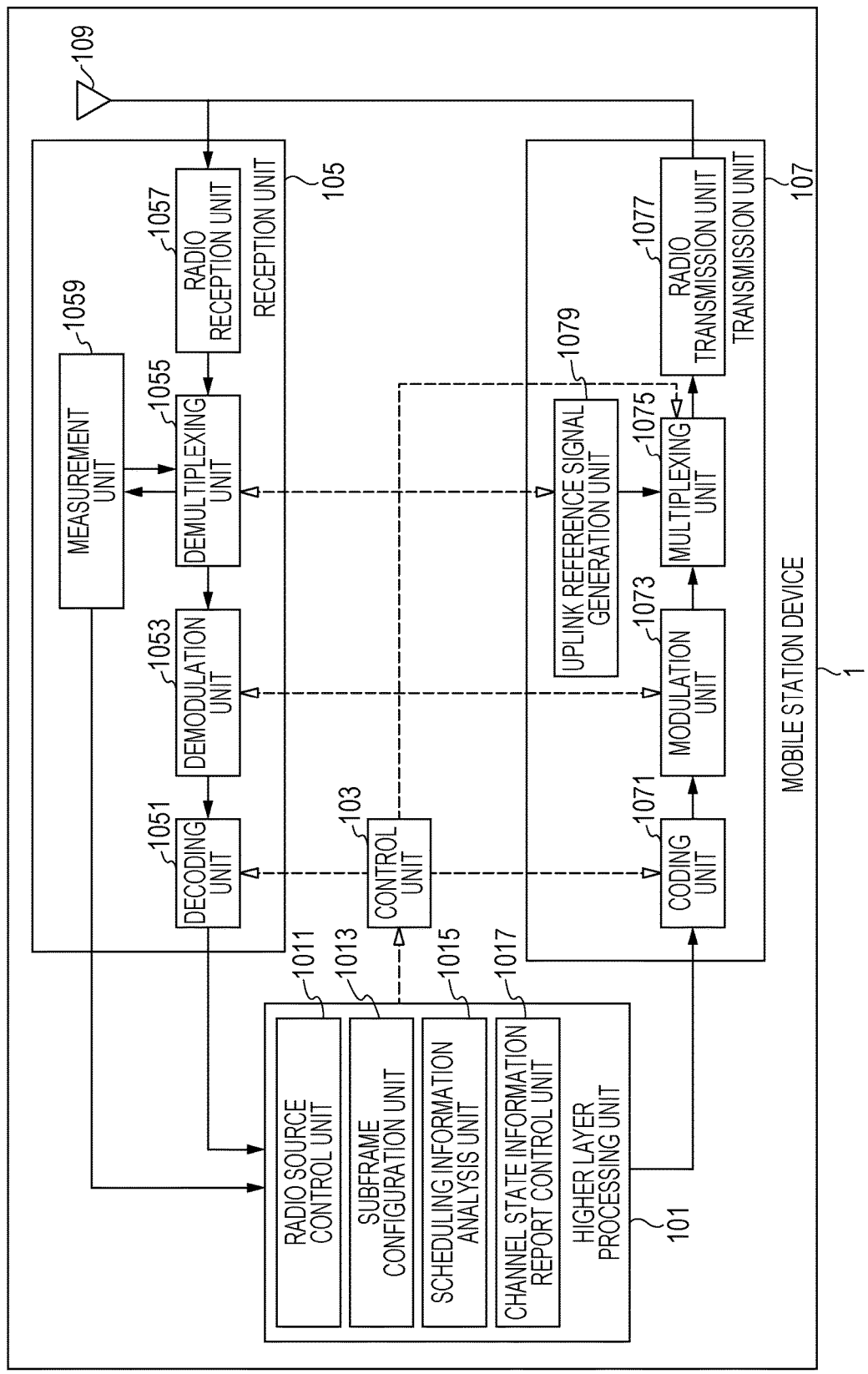
FIG. 7 is a schematic block diagram illustrating the structure of a mobile station device according to the embodiment of the present invention.

FIG. 7 is a schematic block diagram illustrating the structure of the mobile station device 1 according to the embodiment. As illustrated, the mobile station device 1 is configured to include a higher layer processing unit 101, a control unit 103, a reception unit 105, a transmission unit 107, and a transmission and reception antenna 109. The higher layer processing unit 101 is configured to include a radio resource control unit 1011, a subframe configuration unit 1013, a scheduling information analysis unit 1015, and a channel state information (CSI) report control unit 1017. The reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data (transport block) generated through a user operation or the like to the transmission unit 107. The higher layer processing unit 101 performs processes for a medium access control (MAC) layer, a packet data convergence protocol (PDCP) layer, a radio link control (RLC) layer, and a radio resource control (RRC) layer.

The radio resource control unit 1011 included in the higher layer processing unit 101 manages various kinds of setting information regarding the own device. The radio resource control unit 1011 generates information arranged in each uplink channel and outputs the information to the transmission unit 107.

The subframe configuration unit 1013 included in the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration.

The subframe configuration unit 1013 sets the first uplink reference UL-DL configuration, the first downlink reference UL-DL configuration, a configuration value of the second uplink reference UL-DL configuration, the second downlink reference UL-DL configuration, and a configuration value of the transmission direction UL-DL configuration. The subframe configuration unit 1013 sets at least two subframe sets.

The scheduling information analysis unit 1015 included in the higher layer processing unit 101 analyzes the DCI format (scheduling information) received via the reception unit 105, generates control information to control the reception unit 105 and the transmission unit 107 based on the result obtained by analyzing the DCI format, and outputs the control information to the control unit 103.

The scheduling information analysis unit 1015 decides timings of a transmission process and a reception process based on the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 1017 specifies CSI reference resources. The CSI report control unit 1017 instructs the measurement unit 1059 to derive a CQI related to the CSI reference resources. The CSI report control unit 1017 instructs the transmission unit 107 to transmit the CQI.

The CSI report control unit 1017 sets configuration values used when the measurement unit 1059 calculates the CQI.

The control unit 103 generates control signals for controlling the reception unit 105 and the transmission unit 107 based on the control information from the higher layer processing unit 101. The control unit 103 controls the reception unit 105 and the transmission unit 107 by outputting the generated control signals to the reception unit 105 and the transmission unit 107.

The reception unit 105 performs processes such as demultiplexing, demodulating, and decoding on a received signal received from the base station device 3 via the transmission and reception antenna 109 in accordance with the control signals input from the control unit 103 and outputs the decoded information to the higher layer processing unit 101.

The radio reception unit 1057 converts (downconverts) a downlink signal received via the transmission and reception antenna 109 into an intermediate frequency, and removes unnecessary frequency components. The radio reception unit 1057 controls an amplification level so that a signal level is appropriately maintained, performs orthogonal demodulation based on an in-phase component and an orthogonal component of the received signal, and converts an analog signal subjected to the orthogonal demodulation into a digital signal. The radio reception unit 1057 removes a portion corresponding to a Guard Interval (GI) from the converted digital signal and performs Fast Fourier Transform (FFT) on the signal from which the guard interval is removed and extracts a signal of the frequency domain.

The demultiplexing unit 1055 demultiplexes the extracted signal into the PHICH, the PDCCH, the EPDCCH, the PDSCH, and the downlink reference signal. The demultiplexing unit 1055 compensates propagation paths of the PHICH, the PDCCH, the EPDCCH, and the PDSCH from estimated values of the propagation paths input from the measurement unit 1059. The demultiplexing unit 1055 outputs the demultiplexed downlink reference signal to the measurement unit 1059.

The demodulation unit 1053 multiples and combines codes corresponding to the PHICH, demodulates the combined signal in conformity to a binary phase shift keying (BPSK) modulation scheme, and outputs a demodulated signal to the decoding unit 1051. The decoding unit 1051 decodes the PHICH destined for the own device and outputs the decoded HARQ indicator to the higher layer processing unit 101. The demodulation unit 1053 demodulates the PDCCH and/or the EPDCCH in conformity to a QPSK modulation scheme and outputs the demodulated PDCCH and/or the EPDCCH to the decoding unit 1051. The decoding unit 1051 attempts to decode the PDCCH and/or the EPDCCH. In a case in which the decoding succeeds, the decoded downlink control information and the RNTI corresponding to the downlink control information are output to the higher layer processing unit 101.

The demodulation unit 1053 demodulates the PDSCH in conformity to a demodulation scheme reported with the downlink grant, such as quandrature phase shift keying (QPSK), 16 quandrature amplitude modulation (QAM), or 64 QAM and outputs the demodulated PDSCH to the decoding unit 1051. The decoding unit 1051 performs decoding based on information regarding a coding ratio reported with the downlink control information and outputs the decoded downlink data (transport block) to the higher layer processing unit 101.

The measurement unit 1059 measures a downlink path loss or channel state from the downlink reference signal input from the demultiplexing unit 1055 and outputs the measured path loss or the channel state to the higher layer processing unit 101. The measurement unit 1059 calculates an estimated value of the downlink propagation path from the downlink reference signal and outputs the estimated value to the demultiplexing unit 1055. The measurement unit 1059 performs channel measurement and/or interference measurement in order to calculate the CQI.

The transmission unit 107 generates an uplink reference signal according to the control signal input from the control unit 103, codes and modulates the uplink data (the transport block) input from the higher layer processing unit 101, generates a multiplexed signal by multiplexing the PUCCH, the PUSCH, and the generated uplink reference signal, and transmits the generated multiplexed signal to the base station device 3 via the transmission and reception antenna 109.

The coding unit 1071 performs a coding process such as convolution coding or block coding on the uplink control information input from the higher layer processing unit 101. The coding unit 1071 further performs a coding process such as turbo coding on the coded uplink control information based on information used to schedule the PUSCH.

The modulation unit 1073 modulates coded bits input from the coding unit 1071 in conformity to a modulation scheme, such as BPSK, QPSK, 16 QAM, or 64 QAM, indicated by the downlink control information or a modulation scheme decided in advance for each channel. The modulation unit 1073 decides the number of series of data subjected to spatial multiplexing based on the information used to schedule the PUSCH, maps a plurality of pieces of uplink data transmitted with the same PUSCH to the plurality of series by using multiple input multiple output spatial multiplexing (MIMO SM), and performs precoding on the series.

The uplink reference signal generation unit 1079 generates a series obtained by a pre-decided rule (expression) based on a physical cell identity (PCI) (referred to as a cell ID or the like) for identifying the base station device 3, a bandwidth in which the uplink reference signal is arranged, cyclic shift reported with an uplink grant, a value of a parameter for generating a DMRS sequence, and the like. The multiplexing unit 1075 sorts the modulation symbols of the PUSCH in parallel according to the control signal input from the control unit 103, and then performs discrete Fourier transform (DFT). The multiplexing unit 1075 performs a process of generating a multiplexed signal by multiplexing the signal of the PUCCH, the signal of the PUSCH and the generated uplink reference signal for each transmission antenna port. That is, the multiplexing unit 1075 arranges the signal of the PUCCH, the signal of the PUSCH, and the generated uplink reference signal in the resource elements for each transmission antenna port.

The radio transmission unit 1077 performs inverse fast Fourier transform (IFFT) on the multiplexed signal performs a modulation process on the multiplexed signal after the inverse fast Fourier transform in conformity to an SC-FDMA scheme. The radio transmission unit 1077 generates a baseband digital signal by adding the guard interval to the SC-FDMA symbol obtained through the SC-FDMA modulation and converts the baseband digital signal into an analog signal. The radio transmission unit 1077 generates an in-phase component and an orthogonal component of an intermediate frequency from the analog signal, and then removes an excessive frequency component in an intermediate frequency band. The radio transmission unit 1077 converts (upconverts) the signal with the intermediate frequency from which the excessive frequency component is removed into a signal with a high frequency, then removes the excessive frequency component again, performs a power amplification process on the signal with the high frequency from which the excessive frequency component is removed, and outputs the signal with the high frequency subjected to the power amplification process to the transmission and reception antenna 109.

Figure 8:
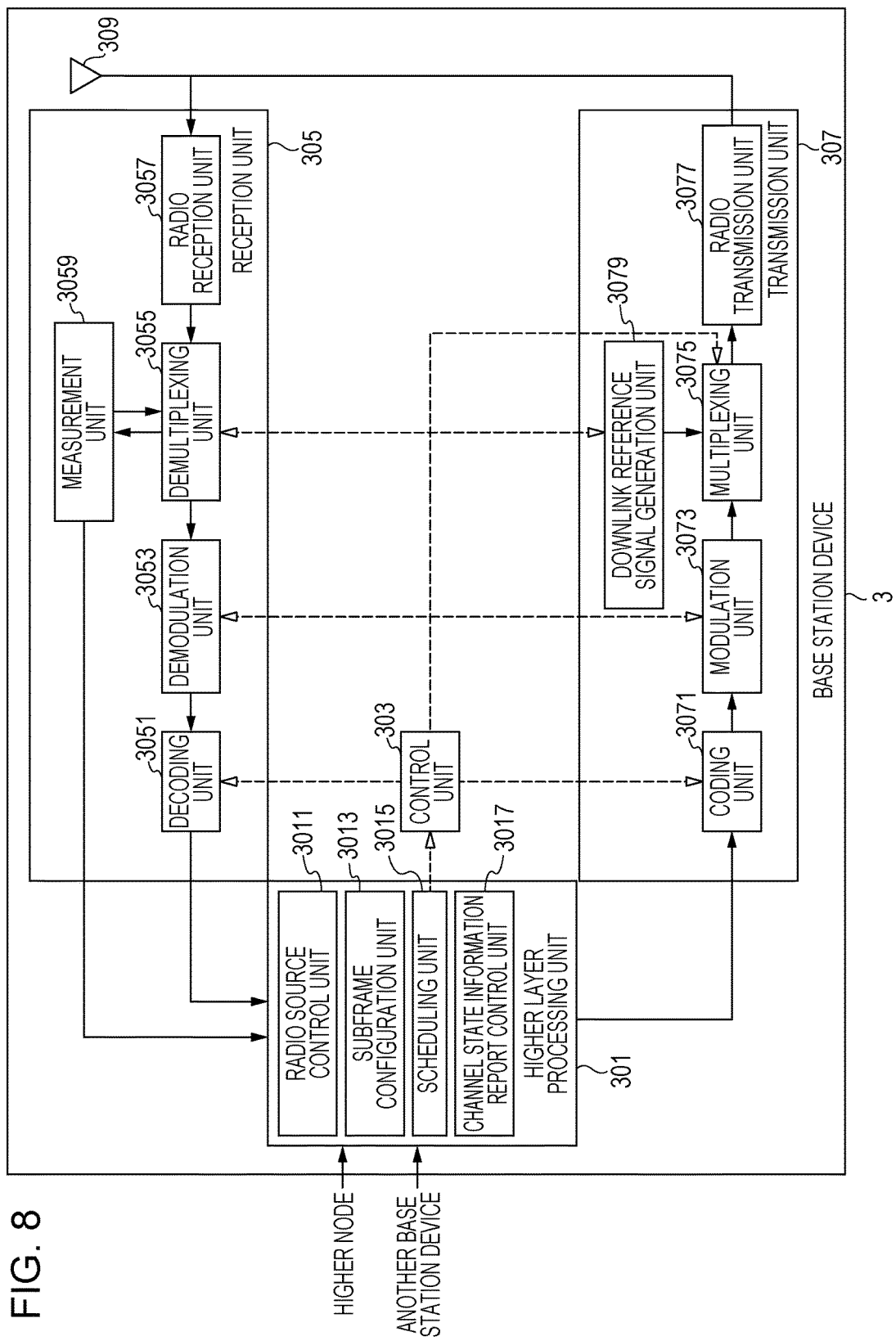
FIG. 8 is a schematic block diagram illustrating the structure of a base station device according to the embodiment of the present invention.

FIG. 8 is a schematic block diagram illustrating the structure of the base station device 3 according to the embodiment. As illustrated, the base station device 3 is configured to include a higher layer processing unit 301, a control unit 303, a reception unit 305, a transmission unit 307, and a transmission and reception antenna 309. The higher layer processing unit 301 is configured to include a radio resource control unit 3011, a subframe configuration unit 3013, a scheduling unit 3015, and a CSI report control unit 3017. The reception unit 305 is structured to include a decoding unit 3051, a demodulation unit 3053, a demultiplexing unit 3055, a radio reception unit 3057, and a channel measurement unit 3059. The transmission unit 307 is structured to include a coding unit 3071, a modulation unit 3073, a multiplexing unit 3075, a radio transmission unit 3077, and a downlink reference signal generation unit 3079.

The higher layer processing unit 301 performs processes for a medium access control (MAC) layer, a packet data convergence protocol (PDCP) layer, a radio link control (RLC) layer, and a radio resource control (RRC) layer. The higher layer processing unit 301 generates control information to control the reception unit 305 and the transmission unit 307 and outputs the generated control information to the control unit 303.

The radio resource control unit 3011 included in the higher layer processing unit 301 generates downlink data (transport block) arranged in the downlink PDSCH, system information, an RRC message, a MAC control element (CE), and the like or acquires these pieces of information from a higher node, and outputs the generated or acquired information to the transmission unit 307. The radio resource control unit 3011 manages various kinds of configuration information regarding each mobile station device 1.

The subframe configuration unit 3013 included in the higher layer processing unit 301 manages the first uplink reference UL-DL configuration, the first downlink reference UL-DL configuration, the second uplink reference UL-DL configuration, the second downlink reference UL-DL configuration, and the transmission direction UL-DL configuration in each of the plurality of mobile station devices 1.

The subframe configuration unit 3013 sets the first uplink reference UL-DL configuration, the first downlink reference UL-DL configuration, the second uplink reference UL-DL configuration, the second downlink reference UL-DL configuration, and the transmission direction UL-DL configuration in each of the plurality of mobile station devices 1.

The subframe configuration unit 3013 generates first information indicating the first uplink reference UL-DL configuration, second information indicating the first downlink reference UL-DL configuration, and third information indicating the transmission direction UL-DL configuration. The subframe configuration unit 3013 transmits the first information, the second information, and the third information to the mobile station device 1 via the transmission unit 307.

The base station device 3 may decide content of the first uplink reference UL-DL configuration, the first downlink reference UL-DL configuration, the second uplink reference UL-DL configuration, the second downlink reference UL-DL configuration, and/or the transmission direction UL-DL configuration in regard to the mobile station device 1. The base station device 3 may receive designation of the content of the first uplink reference UL-DL configuration, the first downlink reference UL-DL configuration, the second uplink reference UL-DL configuration, the second downlink reference UL-DL configuration, and/or the transmission direction UL-DL configuration in regard to the mobile station device 1 from a higher node.

For example, the subframe configuration unit 3013 may decide content of the first uplink reference UL-DL configuration, the first downlink reference UL-DL configuration, the second uplink reference UL-DL configuration, the second downlink reference UL-DL configuration, and/or the transmission direction UL-DL configuration based on an amount of uplink traffic and an amount of downlink traffic.

The subframe configuration unit 3013 manages at least two subframe sets. The subframe configuration unit 3013 may set at least two subframe sets in each of the plurality of mobile station devices 1. The subframe configuration unit 3013 may set at least two subframe sets in each of the plurality of serving cells. The subframe configuration unit 3013 may set at least two subframe sets in each of the plurality of CSI processes.

The subframe configuration unit 3013 transmits information indicating at least two subframe sets to the mobile station device 1 via the transmission unit 307.

The scheduling unit 3015 included in the higher layer processing unit 301 decides frequencies and subframes to which the physical channels (the PDSCH and the PUSCH) are allocated and coding ratios, modulation schemes, transmission power, and the like of the physical channels (the PDSCH and the PUSCH) based on the received channel state information and the estimated value of the propagation path, channel quality, or the like input from the channel measurement unit 3059. The scheduling unit 3015 decides whether to schedule the downlink physical channel and/or the downlink physical signal or whether to schedule the uplink physical channel and/or the uplink physical signal in a flexible subframe. The scheduling unit 3015 generates control information (for example, the DCI format) to control the reception unit 305 and the transmission unit 307 based on the scheduling result and outputs the generated control information to the control unit 303.

The scheduling unit 3015 generates information used to schedule the physical channels (the PDSCH and the PUSCH) based on the scheduling result. The scheduling unit 3015 further decides timings at which a transmission process and a reception process are performed based on the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 3017 included in the higher layer processing unit 301 controls a CSI report of the mobile station device 1. The CSI report control unit 3017 transmits information indicating various kinds of configuration assumed for the mobile station device 1 to derive the CQI in the CSI reference resources to the mobile station device 1 via the transmission unit 307.

The control unit 303 generates a control signal for controlling the reception unit 305 and the transmission unit 307 based on the control information from the higher layer processing unit 301. The control unit 303 controls the reception unit 305 and the transmission unit 307 by outputting the generated control signals to the reception unit 305 and the transmission unit 307.

The reception unit 305 performs processes such as demultiplexing, demodulating, and decoding on a received signal received from the mobile station device 1 via the transmission and reception antenna 309 in accordance with the control signals input from the control unit 303 and outputs the decoded information to the higher layer processing unit 301. The radio reception unit 3057 converts (downconverts) an uplink signal received via the transmission and reception antenna 309 into a signal with an intermediate frequency, removes unnecessary frequency components from the signal with the intermediate frequency, controls an amplification level of the signal with the intermediate frequency, performs orthogonal demodulation on the signal with the intermediate frequency based on an in-phase component and an orthogonal component of the received signal, and converts the signal subjected to the orthogonal demodulation into a digital signal.

The radio reception unit 3057 removes a portion corresponding to a guard interval (GI) from the converted digital signal. The radio reception unit 3057 extracts a signal of the frequency domain by performing fast Fourier transform (FFT) on the signal from which the guard interval is removed and outputs the extracted signal to the demultiplexing unit 3055.

The demultiplexing unit 1055 demultiplexes the signal input from the radio reception unit 3057 into the PUCCH, the PUSCH, and the uplink reference signal. The demultiplexing unit 1055 performs demultiplexing based on allocation information (allocation information decided in advance by the radio resource control unit 3011) of radio resources included in the uplink grant reported to each mobile station device 1 by the base station device 3. The demultiplexing unit 3055 compensates propagation paths of the PUCCH and the PUSCH from estimated values of the propagation paths input from the channel measurement unit 3059. The demultiplexing unit 3055 outputs the demultiplexed uplink reference signal to the channel measurement unit 3059.

The demodulation unit 3053 acquires the modulation symbol by performing inverse discrete Fourier transform (IDFT) on the PUSCH and performs a demodulation process on each of the modulation symbols of the PUCCH and the PUSCH using a pre-decided scheme such as binary phase shift keying (BPSK), QPSK, 16 QAM, or 64 QAM or a modulation scheme reported in advance with the uplink grant to each mobile station device 1 by the base station device 3. The demodulation unit 3053 demultiplexes the modulation symbol of the plurality of pieces of uplink data transmitted with the same PUSCH by using the MIMO SM based on the number of series reported with the uplink grant to each mobile station device 1 and subjected to the spatial multiplexing and information instructing precoding performed on the series.

The decoding unit 3051 performs a decoding process on coded bits of the demodulated PUCCH and PUSCH in conformity to a pre-decided coding scheme at a coding ratio or a coding ratio reported in advance with the uplink grant to the mobile station device 1 by the base station device 3, and then outputs the decoded uplink data and the uplink control information to the higher layer processing unit 101. In a case in which the PUSCH is retransmitted, the decoding unit 3051 performs the decoding by using the coded bits input from the higher layer processing unit 301 and retained in an HARQ buffer and the demodulated coded bits. The channel measurement unit 309 measures an estimated value of the propagation path, equality of the channel, and the like from the uplink reference signal input from the demultiplexing unit 3055 and outputs the estimated value of the propagation path, the quality of the channel, and the like to the demultiplexing unit 3055 and the higher layer processing unit 301.

The transmission unit 307 generates a downlink reference signal according to the control signal input from the control unit 303, codes and modulates the HARQ indicator, the downlink control information, and the downlink data input from the higher layer processing unit 301, generates a multiplexed signal by multiplexing the PHICH, the PDCCH, the EPDCCH, the PDSCH, and the downlink reference signal, and transmits the multiplexed signal to the mobile station device 1 via the transmission and reception antenna 309.

The coding unit 3071 performs coding on the HARQ indicator, the downlink control information, and the downlink data input from the higher layer processing unit 301 by using a pre-decided coding scheme such as block coding, convolution coding, or turbo coding or a coding scheme decided by the radio resource control unit 3011. The modulation unit 3073 modulates coded bits input from the coding unit 3071 in conformity to a modulation scheme, such as BPSK, QPSK, 16 QAM, or 64 QAM, decided in advance or decided by the radio resource control unit 3011.

The downlink reference signal generation unit 3079 generates, as a downlink reference signal, a series known by the mobile station device 1 and obtained by a pre-decided rule based on a physical cell identity (PCI) for identifying the base station device 3. The multiplexing unit 3075 generates a multiplexed signal by multiplexing the modulated modulation symbol of each channel and the generated downlink reference signal. That is, the multiplexing unit 3075 arranges the modulated modulation symbol of each channel and the generated downlink reference signal in the resource elements.

The radio transmission unit 3077 performs inverse fast Fourier transform (IFFT) on the multiplexed signal performs a modulation process on the multiplexed signal after the inverse fast Fourier transform in conformity to an OFDM scheme. The radio transmission unit 1077 generates a baseband digital signal by adding the guard interval to the OFDM symbol obtained through the OFDM modulation and converts the baseband digital signal into an analog signal. The radio transmission unit 1077 generates an in-phase component and an orthogonal component of an intermediate frequency from the analog signal, and then removes an excessive frequency component in an intermediate frequency band. The radio transmission unit 1077 converts (upconverts) the signal with the intermediate frequency from which the excessive frequency component is removed into a signal with a high frequency, then removes the excessive frequency component again, performs a power amplification process on the signal with the high frequency from which the excessive frequency component is removed, and outputs the signal with the high frequency subjected to the power amplification process to the transmission and reception antenna 309.

Hereinafter, the first uplink reference UL-DL configuration, the first downlink reference UL-DL configuration, the second uplink reference UL-DL configuration, the second downlink reference UL-DL configuration, and the transmission direction UL-DL configuration will be described.

The first uplink reference UL-DL configuration, the first downlink reference UL-DL configuration, the second uplink reference UL-DL configuration, the second downlink reference UL-DL configuration, and the transmission direction UL-DL configuration are defined in accordance with an uplink-downlink configuration (UL-DL configuration).

The uplink-downlink configuration is a configuration regarding a pattern of the subframes in the radio frame. The uplink-downlink configuration indicates that each subframe in the radio frame is one of the downlink subframe, the uplink subframe, and the special subframe.

That is, the first uplink reference UL-DL configuration, the second uplink reference UL-DL configuration, the first downlink reference UL-DL configuration, the second downlink reference UL-DL configuration, and the transmission direction UL-DL configuration are defined by the pattern of the downlink subframe, the uplink subframe, and the special subframe in the radio frame.

The pattern of the downlink subframe, the uplink subframe, and the special subframe indicates that each of subframes #0 to #9 is one of the downlink subframe, the uplink subframe, and the special subframe. Preferably, the pattern is expressed by a letter string with a length of 10 formed by any combination of D, U, and S (which indicate the downlink subframe, the uplink subframe, and the special subframe, respectively). More preferably, the pattern is expressed by a letter string such as D which is the beginning letter (that is, a letter indicating classification of subframe #0) and S which is the second letter (that is, a letter indicating classification of subframe #1) from the beginning.

FIG. 9 is a table illustrating an example of an uplink-downlink configuration according to the embodiment. In FIG. 9, D indicates the downlink subframe, U indicates the uplink subframe, and S indicates the special subframe.

As understood from FIG. 9, subframe 1 in the radio frame is normally a special subframe. As understood from FIG. 9, subframes 0 and 5 are reserved normally for downlink transmission and subframe 2 is reserved normally for uplink transmission.

As understood from FIG. 9, in a case in which the downlink-to-uplink switch-point periodicity is 5 ms, subframe 6 in the radio frame is a special subframe. In a case in which the downlink-to-uplink switch-point periodicity is 10 ms, subframe 6 in the radio frame is a downlink subframe.

The first uplink reference UL-DL configuration is also referred to as a first parameter, a first configuration, or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

Setting of an uplink-downlink configuration value i as the first uplink reference UL-DL configuration is referred to as setting of a first uplink reference UL-DL configuration value i. Similarly, setting of an uplink-downlink configuration value i as the second uplink reference UL-DL configuration is referred to as setting of a second uplink reference UL-DL configuration value Setting of the uplink-downlink configuration value i as the first downlink reference UL-DL configuration is referred to as setting of a first downlink reference UL-DL configuration value i. Similarly, setting of an uplink-downlink configuration value i as the second downlink reference UL-DL configuration is referred to as setting of a second downlink reference UL-DL configuration value i. Setting of an uplink-downlink configuration value i as the transmission direction UL-DL configuration is referred to as setting of a transmission direction UL-DL configuration value i.

Hereinafter, methods of setting the first uplink reference UL-DL configuration, the first downlink reference UL-DL configuration, and the transmission direction UL-DL configuration will be described.

The base station device 3 sets the first uplink reference UL-DL configuration, the first downlink UL-DL configuration value, and the transmission direction UL-DL configuration value. The base station device 3 may include the first information (TDD-Config) indicating the first uplink reference UL-DL configuration, the second information indicating the first downlink reference UL-DL configuration, and the third information indicating the transmission direction UL-DL configuration in at least one of the MIB, the system information block type 1 message, the system information message, the RRC message, the MAC control element (CE), and the control information (for example, the DCI format) of the physical layer to transmit the first information, the second information, and the third information. Depending on a situation, the base station device 3 may include the first information, the second information, and the third information in any of the MIB, the system information block type 1 message, the system information message, the RRC message, the MAC control element (CE), the control information (for example, the DCI format) of the physical layer.

For each of a plurality of serving cells, the first uplink reference UL-DL configuration, the second uplink reference UL-DL configuration, the first downlink reference UL-DL configuration, the second downlink reference UL-DL configuration, and the transmission direction UL-DL configuration may be defined.

For each of the plurality of serving cells, the base station device 3 transmits the first information, the second information, and the third information to the mobile station device 1 in which the plurality of serving cells are configured. For each of the plurality of serving cells, the first information, the second information, and the third information may be defined.

The base station device 3 may transmit the first information in regard to the primary cell, the second information in regard to the primary cell, the third information in regard to the primary cell, the first information in regard to the secondary cell, the second information in regard to the secondary cell, and the third information in regard to the secondary cell to the mobile station device 1 in which two serving cells structured as one primary cell and one secondary cell are set.

The mobile station device 1 in which the plurality of serving cells are configured may set the configuration value of the first uplink reference UL-DL configuration, the configuration value of the first downlink reference UL-DL configuration, and the configuration value of the transmission direction DL-UL configuration based on the first information, the second information, and the third information in regard to each serving cell.

The mobile station device 1 in which to two serving cells structured as one primary cell and one secondary cell are set may set the configuration value of the first uplink reference UL-DL configuration in regard to the primary cell, the configuration value of the first downlink reference UL-DL configuration in regard to the primary cell, the configuration value of the transmission direction DL-UL configuration in regard to the primary cell, the configuration value of the first uplink reference UL-DL configuration in regard to the secondary cell, the configuration value of the first downlink reference UL-DL configuration in regard to the secondary cell, and the configuration value of the transmission direction UL-DL configuration in regard to the secondary cell.

The first information in regard to the primary cell is preferably included in the system information block type 1 message or the RRC message. The first information in regard to the secondary cell is preferably included in the RRC message. The second information in regard to the primary cell is preferably included in the system information block type 1 message, the system information message, or the RRC message. The second information in regard to the secondary cell is preferably included in the RRC message. The third information is preferably included in the control information (for example, the DCI format) of the physical layer.

The first information is preferably information which is commonly used by the plurality of mobile station devices 1 in the cell. The second information may be information which is commonly used by the plurality of mobile station devices 1 in the cell or may be information which is dedicatedly used by the certain mobile station device 1 in the cell. The third information may be information which is commonly used by the plurality of mobile station devices 1 in the cell or may be information which is dedicatedly used by the certain mobile station device 1 in the cell.

The system information block type 1 message is initially transmitted via the PDSCH with subframe 5 of a radio frame in which "SFN mod 8=0" is satisfied, and the system information block type 1 message is retransmitted (repeated) with subframe 5 of all the other radio frames satisfying "SFN mod 2=0". The system information block type 1 message includes information indicating the structure (the lengths of the DwPTS, the GP, and the UpPTS) of the special subframe. The system information block type 1 message is cell-unique information.

The system information message is transmitted via the PDSCH. The system information message is cell-unique information. The system information message includes a system information block X other than system information block type 1.

The RRC message is transmitted via the PDSCH. The RRC message is information/signal processed in an RRC layer. The RRC message may be information which is commonly used by the plurality of mobile station devices 1 in the cell or may be information which is dedicatedly used by a specific mobile station device 1.

The MAC CE is transmitted via the PDSCH. The MAC CE is information/signal processed in a MAC layer.

In a case in which the mobile station device 1 receives the control information (for example, the DCI format) of the physical layer including the first information and/or the second information and/or the third information in subframe n−k via the downlink physical channel (for example, the PDCCH/EPDCCH), the mobile station device 1 preferably sets (validates) the first uplink reference UL-DL configuration and/or the first downlink reference UL-DL configuration and/or the transmission direction UL-DL configuration in subframe n. For example, k is 4 or 8. For example, subframe n+k is a subframe with which the HARQ-ACK (ACK) for the downlink physical channel (for example, the PDCCH/EPDCCH) used to transmit the control information (for example, the DCI format) of the physical layer is transmitted. For example, k is decided based on the table of FIG. 21 and the current first or second downlink reference UL-DL configuration or the current second downlink reference UL-DL configuration.

In a case in which the mobile station device 1 receives the control information (for example, the DCI format) of the physical layer including the third information in radio frame n−k via the downlink physical channel (for example, the PDCCH/EPDCCH), the mobile station device 1 preferably sets (validates) the configuration value of the transmission direction UL-DL configuration in radio frame n. For example, k is 1. The third information received in radio frame n−k may be validated only for radio frame n.

Figure 10:
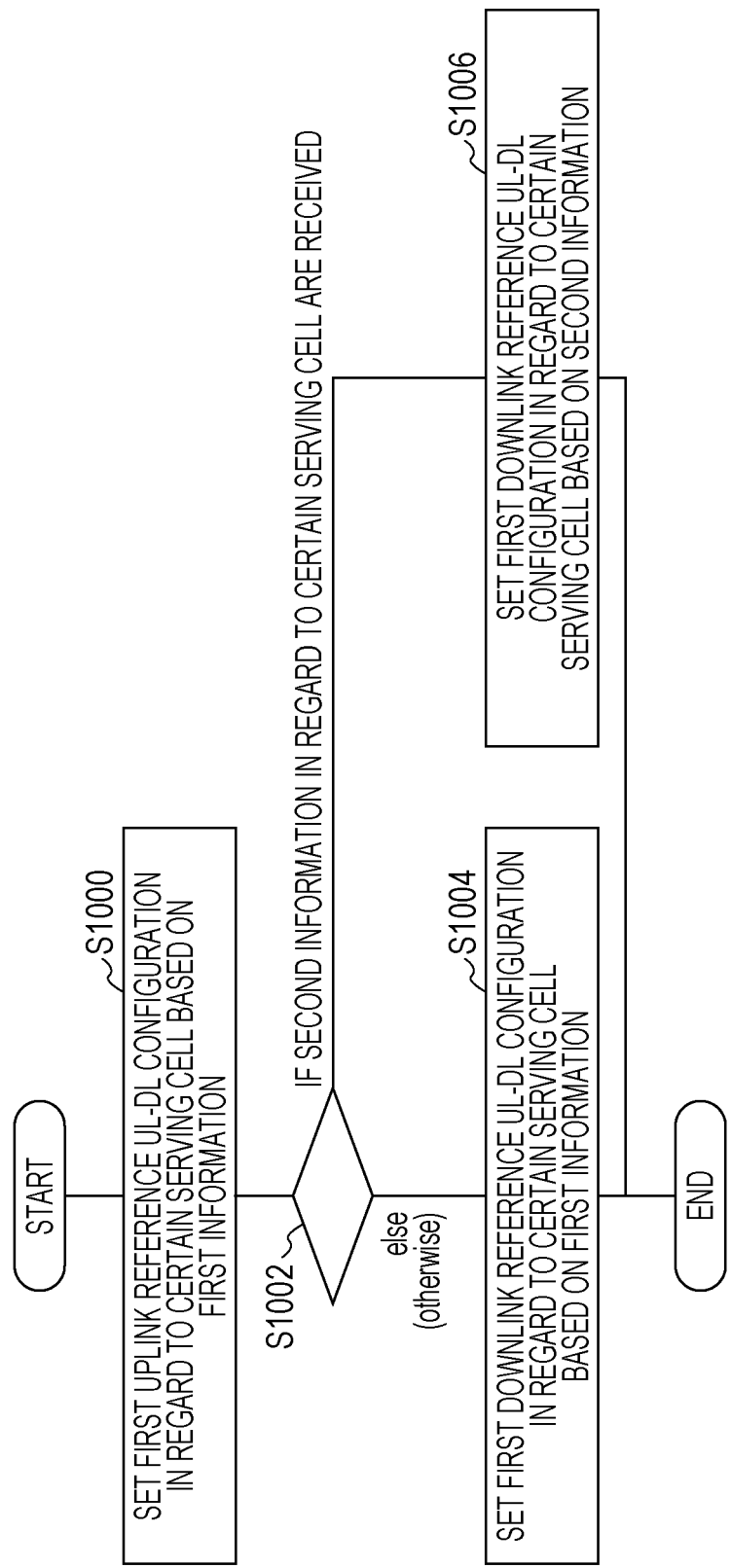
FIG. 10 is a flowchart illustrating a method of setting a first uplink reference UL-DL configuration and a first downlink reference UL-DL configuration according to the embodiment of the present invention.

FIG. 10 is a flowchart illustrating a method of setting a first uplink reference UL-DL configuration and a first downlink reference UL-DL configuration according to the embodiment. The mobile station device 1 performs the setting method of FIG. 10 in each of the plurality of serving cells.

The mobile station device 1 sets the configuration value of the first uplink reference UL-DL configuration in regard to a certain serving cell based on the first information (S1000). The mobile station device 1 determines whether to receive the second information in regard to the certain serving cell (S1002). When the mobile station device 1 receives the second information in regard to the certain serving cell, the mobile station device 1 sets the configuration value of the first downlink reference UL-DL configuration in regard to the certain serving cell based on the second information in regard to the certain serving cell (S1006). When the mobile station device 1 does not receive the second information in regard to the certain serving cell (else/otherwise), the mobile station device 1 sets the configuration value of the first downlink reference UL-DL configuration in regard to the certain serving cell based on the first information in regard to the certain serving cell (S1004).

A serving cell in which the configuration values of the first uplink reference UL-DL configuration and the first downlink reference UL-DL configuration are set based on the first information is also referred to as a serving cell in which a dynamic TDD is not configured. A serving cell in which the configuration value of the first downlink reference UL-DL configuration is set based on the second information is also referred to as a serving cell in which the dynamic TDD is configured.

The mobile station device 1 receives the second information and determines the subframe with which the uplink signal can be transmitted based on the second information. Subsequently, the mobile station device 1 monitors the third information. In a case in which the mobile station device 1 receives the third information, the mobile station device 1 determines the subframe with which an uplink signal can be transmitted based on the third information.

For example, the base station device 3 transmits the third information to the mobile station device 1 using the PDCCH/EPDCCH. The third information is used to control an operation of the dynamic TDD within a coverage of the base station device 3 (cell). The third information is transmitted and received in a common search space (CSS) or a UE-specific search space (USS).

The CSS is a region which is commonly used by the plurality of mobile station devices 1 and in which monitoring of the PDCCH/EPDCCH is performed. The USS is a region which is defined based on at least the C-RNTI. The C-RNTI is an identifier which can be uniquely allocated to the mobile station device 1.

To transmit the DCI format including the third information (information used to give an instruction of a transmission direction of a subframe), the C-RNTI may be used. To transmit the DCI format including the third information (information used to give an instruction of a transmission direction of a subframe), an RNTI different from the C-RNTI and the SPS C-RNTI may be used. The RNTI is referred to as an X-RNTI. That is, the CRC parity bit added to the DCI format including the third information is scrambled with the C-RNTI or the X-RNTI.

The subframe used for the mobile station device 1 to monitor the PDCCH/EPDCCH including the third information may be restricted. The base station device 3 may control the subframe which is used for the mobile station device 1 to monitor the PDCCH/EPDCCH including the third information. The base station device 3 may transmit information used to give an instruction of a subframe with which the mobile station device 1 monitors the PDCCH/EPDCCH including the third information to the mobile station device 1.

For example, the PDCCH/EPDCCH including the third information can be arranged at intervals of 10 subframes. For example, the mobile station device 1 monitors the third information at the intervals of 10 subframes. The subframe in which the PDCCH/EPDCCH including the third information can be arranged may be decided in advance. For example, the third information may be arranged only in subframe 0 or 5 of the radio frame.

The mobile station device 1 starting the operation of the dynamic TDD monitors the PDCCH/EPDCCH including the third information with the subframe in which the PDCCH/EPDCCH including the third information can be arranged.

The mobile station device 1 attempts to decode a received signal and determines whether the PDCCH/EPDCCH including the third information is detected. In a case in which the PDCCH/EPDCCH including the third information is detected, the mobile station device 1 determines the subframe with which an uplink signal can be transmitted based on the detected third information. In a case in which the PDCCH/EPDCCH including the third information is not detected, the mobile station device 1 may maintain the previous determination regarding the subframe with which the uplink signal can be transmitted.

Hereinafter, a method of setting the second uplink reference UL-DL configuration will be described.

In a case in which the plurality of serving cells are set in the mobile station device 1 and the first uplink reference UL-DL configuration is different between at least two serving cells, the mobile station device 1 and the base station device 3 set the configuration value of the second uplink reference UL-DL configuration.

In a case other than the case in which the plurality of serving cells are configured in the mobile station device 1 and the first uplink reference UL-DL configuration is different between at least two serving cells (that is, in a case in which the first uplink reference UL-DL configuration is the same in all of the serving cells), the mobile station device 1 and the base station device 3 may not set the configuration value of the second uplink reference UL-DL configuration.

In a case in which one serving cell is configured in the mobile station device 1, the mobile station device 1 and the base station device 3 may not set the configuration value of the second uplink reference UL-DL configuration.

Figure 11:
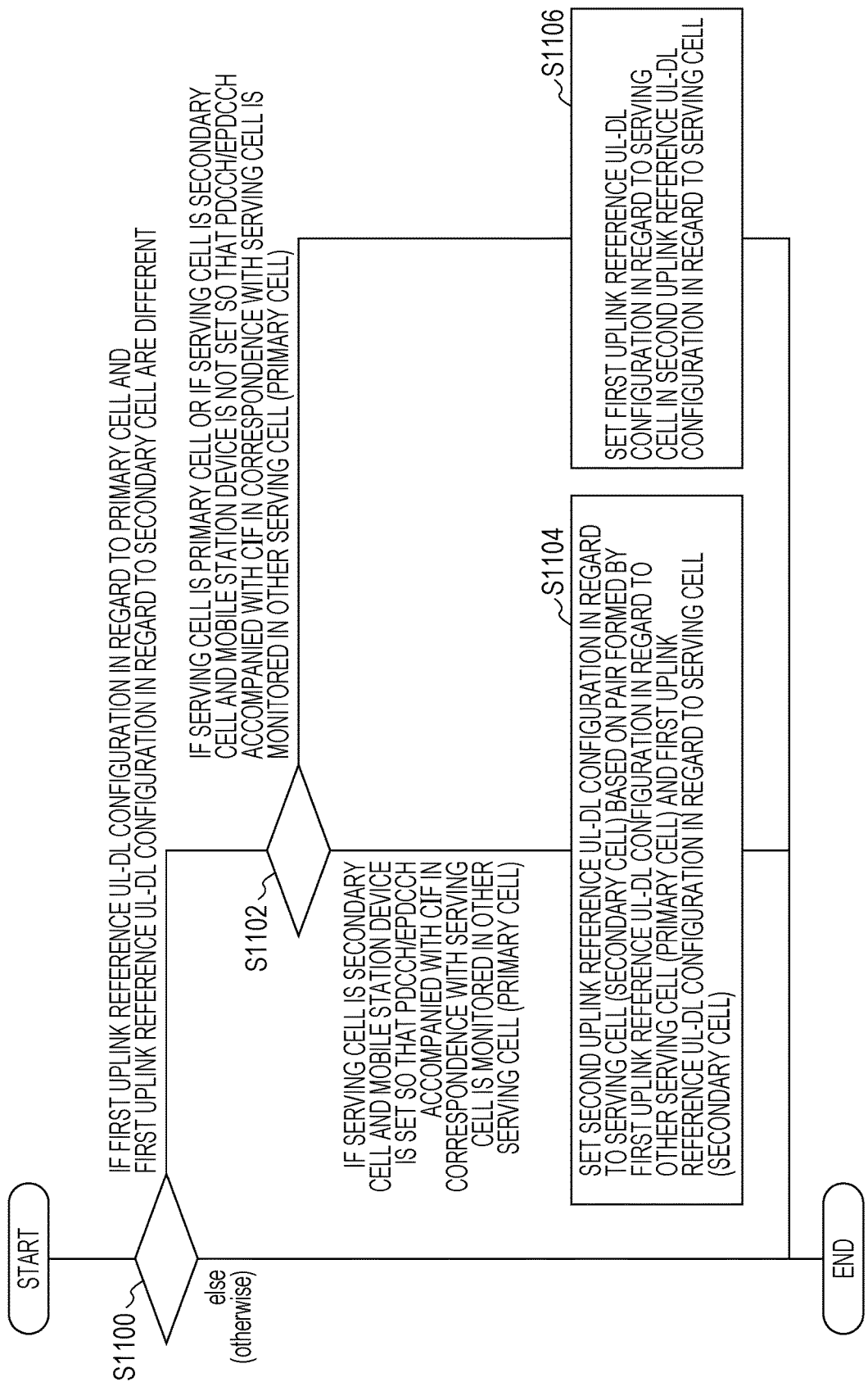
FIG. 11 is a flowchart illustrating a method of setting a second uplink reference UL-DL configuration according to the embodiment of the present invention.

FIG. 11 is a flowchart illustrating a method of setting a second uplink reference UL-DL configuration according to the embodiment. In FIG. 11, one primary cell and one secondary cell are configured in the mobile station device 1. The mobile station device 1 performs the setting method of FIG. 11 in regard to the primary cell and the secondary cell.

The mobile station device 1 determines whether the configuration value of the first uplink reference UL-DL configuration in regard to the primary cell and the configuration value of the first uplink reference UL-DL configuration in regard to the secondary cell are different (S1100). In a case in which the configuration value of the first uplink reference UL-DL configuration in regard to the primary cell and the configuration value of the first uplink reference UL-DL configuration in regard to the secondary cell are the same, the mobile station device 1 ends the process of setting the second uplink reference UL-DL configuration without setting the second uplink reference UL-DL configuration.

In a case in which the configuration value of the first uplink reference UL-DL configuration in regard to the primary cell and the configuration value of the first uplink reference UL-DL configuration in regard to the secondary cell are different, the mobile station device 1 performs the following process. That is, the mobile station device 1 determines whether the serving cell is the primary cell and the secondary cell and/or is configured so that the mobile station device 1 monitors the PDCCH/EPDCCH accompanied with a carrier indicator field (CIF) in correspondence with the serving cell in the other serving cell (S1102).

In a case in which the serving cell is the secondary cell and the motile station device 1 is set so that the mobile station device 1 monitors the PDCCH/EPDCCH accompanied with the CIF in correspondence with the serving cell (the secondary cell) in the other serving cell (the primary cell), the mobile station device 1 performs the following process. That is, the mobile station device 1 sets the configuration value of the second uplink reference UL-DL configuration in regard to the serving cell (the secondary cell) based on a pair formed by the configuration value of the first uplink reference UL-DL configuration in regard to the other serving cell (the primary cell) and the configuration value of the first uplink reference UL-DL configuration in regard to the serving cell (the secondary cell) (S1104).

In S1104, the mobile station device 1 sets the second uplink reference UL-DL configuration in regard to the serving cell (the secondary cell) based on the table of FIG. 12. FIG. 12 is a diagram illustrating correspondence between a pair formed by configuration value of the first uplink reference UL-DL configuration in another serving cell (primary cell) and configuration value of the first uplink reference UL-DL configuration in a serving cell (secondary cell), and configuration value of a second uplink reference UL-DL configuration in the secondary cell according to the embodiment.

In the example of FIG. 12, at the time of the primary cell UL-DL configuration, the mobile station device 1 sets the configuration value of the primary cell UL-DL configuration so that the configuration value of the primary cell UL-DL configuration is the same as the referred configuration value with reference to the configuration value of the first uplink reference UL-DL configuration in regard to the other serving cell (primary cell). In the example of FIG. 12, at the time of the secondary cell UL-DL configuration, the mobile station device 1 sets the configuration value of the secondary cell UL-DL configuration so that the configuration value of the secondary cell UL-DL configuration is the same as the referred configuration value with reference to the configuration value of the first uplink reference UL-DL configuration in regard to the serving cell (secondary cell).

For example, in a case in which "0" is set as the configuration value of the first uplink reference UL-DL configuration in the other serving cell (the primary cell) and "2" is set as the configuration value of the first uplink reference UL-DL configuration 2 in the serving cell (the secondary cell), the mobile station device 1 sets "1" as the configuration value of the second uplink reference UL-DL configuration 1 in the secondary cell.

In a case in which the serving cell is one of the primary cell and the secondary cell and the mobile station device 1 is not configured so that mobile station device 1 monitors the PDCCH/EPDCCH accompanied with the CIF in correspondence with the serving cell (the secondary cell) in the other serving cell (the primary cell), the mobile station device 1 sets the configuration value of the first uplink reference UL-DL configuration in regard to the serving cell to the same value as the configuration value of the second uplink reference UL-DL configuration in regard to the serving cell (S1106).

The base station device 3 sets the second uplink reference UL-DL configuration based on the setting method of FIG. 11.

The monitoring of the PDCCH/EPDCCH accompanied with the CIF means an attempt to decode the PDCCH or the EPDCCH according to the DCI format including the CIF. The CIF is a field to which a carrier indicator is mapped. A value of the carrier indicator indicates the serving cell to which the DCI format related to the carrier indicator corresponds.

The mobile station device 1 which is configured so that the mobile station device 1 monitors the PDCCH/EPDCCH accompanied with the CIF in correspondence with the serving cell in the other serving cell monitors the PDCCH/EPDCCH accompanied with the CIF in the other serving cell.

The mobile station device 1 which is set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The mobile station device 1 which is not set so that the mobile station device 1 monitors the PDCCH/EPDCCH accompanied with the CIF in correspondence with the serving cell in the other serving cell monitors the PDCCH/EPDCCH accompanied with the CIF or not accompanied with the CIF in the other serving cell.

The mobile station device 1 which is not set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The PDCCH/EPDCCH in regard to the primary cell is transmitted in the primary cell. The third information in regard to the primary cell is preferably transmitted via the PDCCH/EPDCCH of the primary cell.

The base station device 3 transmits a parameter (cif-Presence-r10) indicating whether the CIF is included in the DCI format transmitted in the primary cell to the mobile station device 1.

The base station device 3 transmits a parameter (CrossCarrierSchedulingConfig-r10) related to cross carrier scheduling of each secondary cell of the plurality of secondary cells to the mobile station device 1.

The parameter (CrossCarrierSchedulingConfig-r10) includes a parameter (schedulingCellInfo-r10) indicating whether the PDCCH/EPDCCH corresponding to a related secondary cell is transmitted in the secondary cell or the PDCCH/EPDCCH is transmitted the other serving cell.

In a case in which the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether the CIF is included in the DCI format transmitted in the secondary cell.

In a case in which the parameter (schedulingCellInfo-r10) indicates that the PDCCH/EPDCCH corresponding to a related secondary cell is transmitted in the other serving cell, the parameter (schedulingCellInfo-r10) includes a parameter (schedulingCellId) indicating a serving cell in which downlink allocation to the related secondary cell is transmitted.

Hereinafter, a method of setting the second downlink reference UL-DL configuration will be described.

In a case in which the plurality of serving cells are set in the mobile station device 1 and the first downlink reference UL-DL configuration is different between at least two serving cells, the mobile station device 1 and the base station device 3 set the configuration value of the second downlink reference UL-DL configuration. In a case other than the case in which the plurality of serving cells are configured in the mobile station device 1 and the first downlink reference UL-DL configuration is different between at least two serving cells (that is, in a case in which the first downlink reference UL-DL configuration is the same in all of the serving cells), the mobile station device 1 and the base station device 3 may not set the configuration value of the second downlink reference UL-DL configuration.

In a case in which one serving cell is configured in the mobile station device 1, the mobile station device 1 and the base station device 3 may not set the configuration value of the second downlink reference UL-DL configuration.

Figure 13:
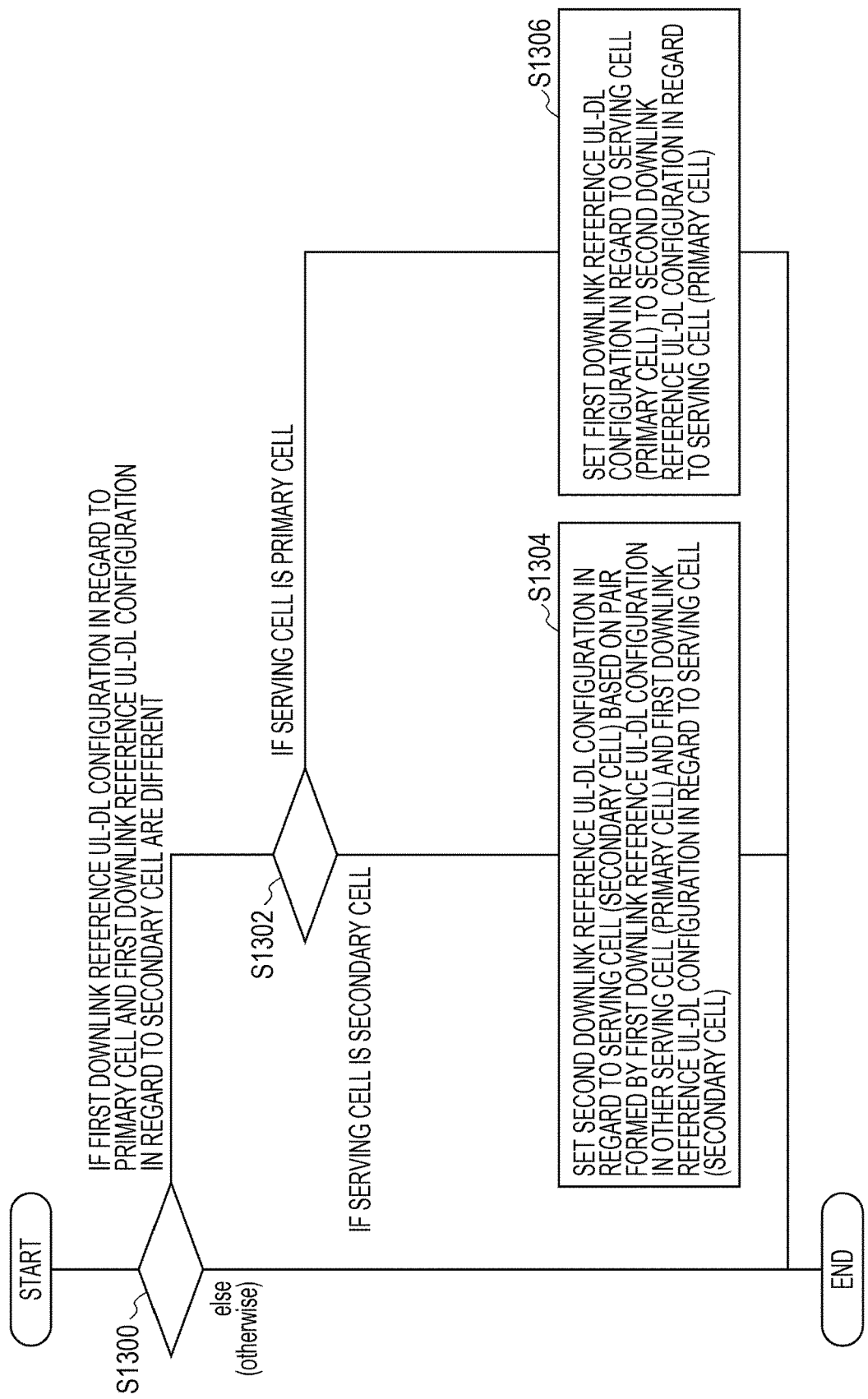
FIG. 13 is a flowchart illustrating a method of setting a second downlink reference UL-DL configuration according to the embodiment of the present invention.

FIG. 13 is a flowchart illustrating a method of setting a second downlink reference UL-DL configuration according to the embodiment. In FIG. 13, one primary cell and one secondary cell are configured in the mobile station device 1. The mobile station device 1 performs the setting method of FIG. 13 in regard to the primary cell and the secondary cell.

The mobile station device 1 determines whether the configuration value of the first downlink reference UL-DL configuration in regard to the primary cell and the configuration value of the first downlink reference UL-DL configuration in regard to the secondary cell are different (S1300). In a case in which the configuration value of the first downlink reference UL-DL configuration in regard to the primary cell and the configuration value of the first downlink reference UL-DL configuration in regard to the secondary cell are the same, the mobile station device 1 ends the process of setting the second downlink reference UL-DL configuration without setting the configuration value of the second downlink reference UL-DL configuration.

When the configuration value of the first downlink reference UL-DL configuration in regard to the primary cell and the configuration value of the first downlink reference UL-DL configuration in regard to the secondary cell are different, the mobile station device 1 determines whether the serving cell is one of the primary cell and the secondary cell (S1302).

In a case in which the serving cell is the secondary cell, the configuration value of the second uplink reference UL-DL configuration in regard to the serving cell (the secondary cell) is set based on a pair formed by the configuration value of the first downlink reference UL-DL configuration in regard to the other serving cell (the primary cell) and the configuration value of the first downlink reference UL-DL configuration in regard to the serving cell (the secondary cell) (S1304).

In S1304, the mobile station device 1 sets the configuration value of the second downlink reference UL-DL configuration in regard to the serving cell (the secondary cell) based on the table of FIG. 14. FIG. 14 is a diagram illustrating correspondence between a pair formed by a configuration value of the first downlink reference UL-DL configuration in a primary cell and a configuration value of the first downlink reference UL-DL configuration in a secondary cell, and a configuration value of a second downlink reference UL-DL configuration in the secondary cell according to the embodiment.

In the example of FIG. 14, at the time of the primary cell UL-DL configuration, the mobile station device 1 sets the configuration value of the primary cell UL-DL configuration so that the configuration value of the primary cell UL-DL configuration is the same as the referred configuration value with reference to the configuration value of the first downlink reference UL-DL configuration in regard to the primary cell. In the example of FIG. 14, at the time of the secondary cell UL-DL configuration, the mobile station device 1 sets the configuration value of the secondary cell UL-DL configuration so that the configuration value of the secondary cell UL-DL configuration is the same as the referred configuration value with reference to the configuration value of the first downlink reference UL-DL configuration in regard to the secondary cell.

In a case in which the pair formed by the configuration value of the first downlink reference UL-DL configuration in regard to the primary cell and the configuration value of the first downlink reference UL-DL configuration in regard to the secondary cell is a pair corresponding to set 1 in FIG. 14, the configuration value of the second downlink reference UL-DL configuration in regard to the secondary cell is defined in the field corresponding to set 1 in FIG. 14.

In a case in which the mobile station device 1 is not configured so that the mobile station device 1 monitors the PDCCH/EPDCCH accompanied with the CIF in correspondence with the secondary cell in the primary cell and the pair formed by the configuration value of the first downlink reference UL-DL configuration in regard to the primary cell and the configuration value of the first downlink reference UL-DL configuration in regard to the secondary cell is a pair corresponding to set 2 in FIG. 14, the configuration value of the second downlink reference UL-DL configuration in regard to the secondary cell is defined in the field corresponding to set 2 in FIG. 14.

In a case in which the mobile station device 1 is not configured so that the mobile station device 1 monitors the PDCCH/EPDCCH accompanied with the CIF in correspondence with the secondary cell in the primary cell and the pair formed by the configuration value of the first downlink reference UL-DL configuration in regard to the primary cell and the configuration value of the first downlink reference UL-DL configuration in regard to the secondary cell is a pair corresponding to set 3 in FIG. 14, the configuration value of the second downlink reference UL-DL configuration in regard to the secondary cell is defined in the field corresponding to set 3 in FIG. 14.

In a case in which the mobile station device 1 is configured so that the mobile station device 1 monitors the PDCCH/EPDCCH accompanied with the CIF in correspondence with the secondary cell in the primary cell and the pair formed by the configuration value of the first downlink reference UL-DL configuration in regard to the primary cell and the configuration value of the first downlink reference UL-DL configuration in regard to the secondary cell is a pair corresponding to set 4 in FIG. 14, the configuration value of the second downlink reference UL-DL configuration in regard to the secondary cell is defined in the field corresponding to set 4 in FIG. 14.

In a case in which the mobile station device 1 is configured so that the mobile station device 1 monitors the PDCCH/EPDCCH accompanied with the CIF in correspondence with the secondary cell in the primary cell and the pair formed by the configuration value of the first downlink reference UL-DL configuration in regard to the primary cell and the configuration value of the first downlink reference UL-DL configuration in regard to the secondary cell is a pair corresponding to set 5 in FIG. 14, the configuration value of the second downlink reference UL-DL configuration in regard to the secondary cell is defined in the field corresponding to set 5 in FIG. 14.

For example, in a case in which "1" is set as the configuration value of the first downlink reference UL-DL configuration is set in regard to the primary cell and "0" is set as the configuration value of the first downlink reference UL-DL configuration in regard to the secondary cell, the mobile station device 1 sets "1" as the configuration value of the second downlink reference UL-DL configuration in regard to the secondary cell.

In a case in which the serving cell is the primary cell, the mobile station device 1 sets the configuration value of the first downlink reference UL-DL configuration in regard to the serving cell (the primary cell) to the same value as the configuration value of the second downlink reference UL-DL configuration in regard to the serving cell (primary cell) (S1306).

The base station device 3 also sets the second downlink reference UL-DL configuration based on the setting method of FIG. 13.

Hereinafter, the first uplink reference UL-DL configuration will be described.

The first uplink reference UL-DL configuration is used at least to specify the subframe with which the uplink transmission is possible or not possible in the serving cell.

The mobile station device 1 does not perform uplink transmission in the subframe designated as the downlink subframe in accordance with the first uplink reference UL-DL configuration. The mobile station device 1 does not perform uplink transmission in the DwPTS and the GP of the subframe designated as the special subframe in accordance with the first uplink reference UL-DL configuration.

Hereinafter, the first downlink reference UL-DL configuration will be described.

The first downlink reference UL-DL configuration is used at least to specify the subframe with which the downlink transmission is possible or not possible in the serving cell.

The mobile station device 1 does not perform downlink transmission in the subframe designated as the uplink subframe in accordance with the first downlink reference UL-DL configuration. The mobile station device 1 does not perform downlink transmission in the UpPTS and the GP of the subframe designated as the special subframe in accordance with the first downlink reference UL-DL configuration.

The mobile station device 1 in which the configuration value of the first downlink reference UL-DL configuration is set based on the first information may perform measurement (for example, measurement related to channel state information) using a downlink signal in the DwPTS of the special subframe or the downlink subframe designated in accordance with the first uplink reference UL-DL configuration or the first downlink reference UL-DL configuration.

Therefore, the base station device 3 decides (selects) the configuration value of the downlink reference UL-DL configuration in a configuration set (a set of configurable values) restricted based on the first uplink reference UL-DL configuration. That is, the configuration value of the first downlink reference UL-DL configuration is an element in the configuration set restricted based on the first uplink reference UL-DL configuration. The configuration set restricted based on the first uplink reference UL-DL configuration includes a configuration value of an uplink-downlink configuration satisfying the following conditions (a) to (c). FIG. 15 is a diagram illustrating a relation between classification of a subframe designated in accordance with the first uplink reference UL-DL configuration and classification of a subframe designated in accordance with the first downlink reference UL-DL configuration according to the embodiment. In FIG. 15, D denotes a downlink subframe, U denotes an uplink subframe, and S denotes a special subframe:

condition (a): the subframe designated as the downlink subframe in accordance with the first uplink reference UL-DL configuration is designated as the downlink subframe;

condition (b): the subframe designated as the uplink subframe in accordance with the first uplink reference UL-DL configuration is designated as the uplink subframe or the downlink subframe; and condition (c): the subframe designated as the special subframe in accordance with the first uplink reference UL-DL configuration is designated as the downlink subframe or the special subframe.

Thus, in the dynamic TDD, the DwPTS of the special subframe and the subframe designated as the downlink subframe in accordance with the first uplink reference UL-DL configuration are not used for uplink transmission.

Therefore, the mobile station device 1 in which the configuration value of the first downlink reference UL-DL configuration is set based on the first information can appropriately perform the measurement using the downlink signal.

The mobile station device 1 in which the configuration value of the first downlink reference UL-DL configuration is set based on the second information may also perform the measurement (for example, measurement related to channel state information) using a downlink signal in the DwPTS of the special subframe or the downlink subframe designated in accordance with the first uplink reference UL-DL configuration.

A subframe designated as the uplink subframe in accordance with the first uplink reference UL-DL configuration and designated as the downlink subframe in accordance with the first downlink reference UL-DL configuration is also referred to as a first flexible subframe. The first flexible subframe is a subframe that is reserved for uplink and downlink transmission.

A subframe designated as the special subframe in accordance with the first uplink reference UL-DL configuration and designated as the downlink subframe in accordance with the first downlink reference UL-DL configuration is also referred to as a second flexible subframe. The second flexible subframe is a subframe that is reserved for downlink transmission. The second flexible subframe is a subframe that is reserved for downlink transmission in the DwPTS and uplink transmission in the UpPTS.

Hereinafter, the transmission direction UL-DL configuration will be described in detail.

the mobile station device 1 and the base station device 3 set the transmission direction UL-DL configuration related to the transmission direction (up/down) in the subframe. The transmission direction UL-DL configuration is used to decide the transmission direction in the subframe.

The mobile station device 1 controls the transmission in the first flexible subframe and the second flexible subframe based on the scheduling information (the DCI format and/or the HARQ-ACK) and the transmission direction UL-DL configuration.

The base station device 3 transmits the third information indicating the transmission direction UL-DL configuration to the mobile station device 1. The third information is information for designating the subframe in which the uplink transmission is possible. The third information is information for designating the subframe in which the downlink transmission is possible. The third information is information for designating the subframe in which the uplink transmission is possible in the UpPTS and the downlink transmission is possible in the DwPTS.

For example, the transmission direction UL-DL configuration is used to specify a transmission direction in the subframe designated as the uplink subframe in accordance with the first uplink reference UL-DL configuration and designated as the downlink subframe in accordance with the first downlink reference UL-DL configuration and/or the subframe designated as the special subframe in accordance with the first uplink reference UL-DL configuration and designated as the downlink subframe in accordance with the first downlink reference UL-DL configuration. That is, the transmission direction UL-DL configuration is used to specify a transmission direction in the subframe designated as a certain type of subframe in accordance with the first uplink reference UL-DL configuration and designated as a different type of subframe in accordance with the first downlink reference UL-DL configuration.

FIG. 16 is a diagram illustrating a relation among classification of a subframe designated in accordance with the first uplink reference UL-DL configuration, classification of a subframe designated in accordance with the first downlink reference UL-DL configuration, and classification of a subframe designated in accordance with a transmission direction UL-DL configuration according to the embodiment. In FIG. 16, D denotes a downlink subframe, U denotes an uplink subframe, and S denotes a special subframe.

The base station device 3 decides (selects) the configuration value of the transmission direction UL-DL configuration in the configuration set (a set of configurable values) restricted based on the first uplink reference UL-DL configuration and the first downlink UL-DL configuration. That is, the configuration value of the transmission direction UL-DL configuration is an element in the configuration set restricted based on the first uplink reference UL-DL configuration and the first downlink reference UL-DL configuration. The configuration set restricted based on the first uplink reference UL-DL configuration and the first downlink reference UL-DL configuration includes a configuration value of an uplink-downlink configuration satisfying the following conditions (d) to (h):

condition (d): the subframe designated as the downlink subframe in accordance with the first uplink reference UL-DL configuration and the first downlink reference UL-DL configuration is designated as the downlink subframe;

condition (e): the subframe designated as the uplink subframe in accordance with the first uplink reference UL-DL configuration and the first downlink reference UL-DL configuration is designated as the uplink subframe;

condition (f): the subframe designated as the uplink subframe in accordance with the first uplink reference UL-DL configuration and designated as the downlink subframe in accordance with the first downlink reference UL-DL configuration is designated as the uplink subframe or the downlink subframe;

condition (g): the subframe designated as the special subframe in accordance with the first uplink reference UL-DL configuration and the first downlink reference UL-DL configuration is designated as the special subframe; and condition (h): the subframe designated as the special subframe in accordance with the first uplink reference UL-DL configuration and the downlink subframe in accordance with the first downlink reference UL-DL configuration is designated as the special subframe or the downlink subframe.

The base station device 3 may schedule the downlink transmission in the subframe designated as the downlink subframe in accordance with the transmission direction UL-DL configuration.

The mobile station device 1 may perform the process of receiving the downlink signal in the subframe designated as the downlink subframe in accordance with the transmission direction UL-DL configuration. The mobile station device 1 may monitor the PDCCH/EPDCCH in the subframe designated as the downlink subframe in accordance with the transmission direction UL-DL configuration. The mobile station device 1 may perform the process of receiving the PDSCH in the subframe designated as the downlink subframe in accordance with the transmission direction UL-DL configuration based on detection of the downlink grant via the PDCCH/EPDCCH.

In a case in which the transmission of an uplink signal (PUSCH/SRS) is scheduled or set in the subframe designated as the downlink subframe in accordance with the transmission direction UL-DL configuration, the mobile station device 1 does not perform the process of transmitting the uplink signal (the PUSCH/SRS) in the subframe.

The base station device 3 may schedule the uplink transmission in the subframe designated as the uplink subframe in accordance with the transmission direction UL-DL configuration.

The base station device 3 may schedule the downlink transmission in the subframe designated as the uplink subframe in accordance with the transmission direction UL-DL configuration. The base station device 3 may prohibit scheduling of the downlink transmission by the base station device 3 in the subframe designated as the uplink subframe in accordance with the transmission direction UL-DL configuration.

The mobile station device 1 may perform the process of transmitting an uplink signal in the subframe designated as the uplink subframe in accordance with the transmission direction UL-DL configuration. In a case in which the transmission of an uplink signal (PUSCH/DMRS/SRS) is scheduled or set in the subframe designated as the uplink subframe in accordance with the transmission direction UL-DL configuration, the mobile station device 1 may perform the process of transmitting the uplink signal (the PUSCH/DMRS/SRS) in the subframe.

The mobile station device 1 may perform the process of receiving a downlink signal in the subframe which is designated as the uplink subframe in accordance with the transmission direction UL-DL configuration and in which the uplink transmission is not scheduled. The mobile station device 1 may prohibit the process of receiving the downlink signal by the mobile station device 1 in the subframe designated as the uplink subframe in accordance with the transmission direction UL-DL configuration.

The base station device 3 may schedule the downlink transmission in the DwPTS of the subframe designated as the special subframe in accordance with the transmission direction UL-DL configuration.

The mobile station device 1 may perform the process of receiving a downlink signal in the DwPTS of the subframe designated as the special subframe in accordance with the transmission direction UL-DL configuration. The mobile station device 1 may monitor the PDCCH/EPDCCH in the DwPTS of the subframe designated as the special subframe in accordance with the transmission direction UL-DL configuration. The mobile station device 1 may perform the process of receiving the PDSCH in the DwPTS of the subframe designated as the special subframe in accordance with the transmission direction UL-DL configuration based on detection of the downlink grant via the PDCCH/EPDCCH.

In a case in which the transmission of the PUSCH in the subframe designated as the special subframe is scheduled or set in accordance with the transmission direction UL-DL configuration, the mobile station device 1 does not perform the process of transmitting the PUSCH in the subframe.

In a case in which the transmission of the SRS in the UpPTS of the subframe designated as the special subframe is scheduled or set in accordance with the transmission direction UL-DL configuration, the mobile station device 1 may perform the process of transmitting the SRS in the UpPTS of the subframe.

The CRS, the PDCCH, the PHICH, and/or the PCFICH may not be transmitted with the first flexible subframe designated as the downlink subframe in accordance with the transmission direction UL-DL configuration. In this case, the EPDCCH and the PDSCH are transmitted with the first flexible subframe used as the downlink subframe.

The base station device 3 may control whether to transmit the CRS, the PDCCH, the PHICH, and/or the PCFICH with the first flexible subframe designated as the downlink subframe in accordance with the transmission direction UL-DL configuration. In this case, the base station device 3 transmits the CRS parameter indicating whether to transmit the CRS, the PDCCH, the PHICH, and/or the PCFICH with the first flexible subframe designated as the downlink subframe in accordance with the transmission direction UL-DL configuration to the mobile station device 1. Then, the mobile station device 1 sets the CRS parameter.

The CRS may not be transmitted in the GP and UpPTS fields of the second flexible subframe designated as the downlink subframe in accordance with the transmission direction UL-DL configuration. The base station device 3 may control whether to transmit the CRS in the second flexible subframe designated as the downlink subframe in accordance with the transmission direction UL-DL configuration. In this case, the mobile station device 1 may determine whether to transmit the CRS in the GP and UpPTS fields of the second flexible subframe designated as the downlink subframe in accordance with the transmission direction UL-DL configuration based on the foregoing CRS parameter.

FIG. 17 is a diagram illustrating a relation among the first uplink reference UL-DL configuration, the first downlink reference UL-DL configuration, and the transmission direction UL-DL configuration according to the embodiment.

For example, as understood from FIG. 17, in a case in which the configuration value of the first uplink reference UL-DL configuration is "0", a value serving as the configuration value of the first downlink reference UL-DL configuration is one of a set {0, 1, 2, 3, 4, 5, 6}. For example, as understood from FIG. 17, in a case in which the configuration value of the first uplink reference UL-DL configuration is "1", a value serving as the configuration value of the first downlink reference UL-DL configuration is one of a set {1, 2, 4, 5}.

For example, as understood from FIG. 17, in a case in which the configuration value of the first uplink reference UL-DL configuration is "0" and the configuration value of the first downlink reference UL-DL configuration is "1", a value serving as the configuration value of the transmission direction UL-DL configuration is one of a set {0, 1, 6}.

The configuration value of the first downlink reference UL-DL configuration may be the same value as the configuration value of the first uplink reference UL-DL configuration. Here, the mobile station device 1 not receiving the second information sets the same value as the configuration value of the first uplink reference UL-DL configuration as the configuration value of the first downlink reference UL-DL configuration. Therefore, it is preferable that the configuration value of the first downlink reference UL-DL configuration indicated by the second information be not the same value as the configuration value of the first uplink reference UL-DL configuration indicated by the first information.

In a case in which the configuration value of the first uplink reference UL-DL configuration is the same value as the configuration value of the first downlink reference UL-DL configuration, the configuration value of the transmission direction UL-DL configuration may not be defined. Alternatively, in a case in which the configuration value of the first uplink reference UL-DL configuration is the same value as the configuration value of the first downlink reference UL-DL configuration, the same values as the value of the first uplink reference UL-DL configuration and the value of the first downlink reference UL-DL configuration may be set in the configuration value of the transmission direction UL-DL configuration.

The third information may be information indicating the configuration value of the transmission direction UL-DL configuration selected from the configuration set (a set of configurable values) formed according to the configuration value of the first uplink reference UL-DL configuration and the configuration value of the first downlink reference UL-DL configuration.

Hereinafter, the first uplink reference UL-DL configuration and the second uplink reference UL-DL configuration will be described in detail.

The configuration value of the first uplink reference UL-DL configuration and the configuration value of the second uplink reference UL-DL configuration are used to specify (select or decide) correspondence between subframe n in which the PDCCH/EPDCCH/PHICH is arranged and subframe n+k in which PUSCH corresponding to the PDCCH/EPDCCH/PHICH is arranged.

In a case in which one primary cell is configured or a case in which one primary cell and one secondary cell are configured and the configuration value of the first uplink reference UL-DL configuration in regard to the primary cell is the same value as the configuration value of the first uplink reference UL-DL configuration in regard to the secondary cell, the configuration value of the corresponding first uplink reference UL-DL configuration is used in each of two serving cells to decide correspondence between the subframe in which the PDCCH/EPDCCH/PHICH is arranged and the subframe in which the PUSCH corresponding to the PDCCH/EPDCCH/PHICH is arranged.

In a case in which one primary cell and one secondary cell are configured and the configuration value of the first uplink reference UL-DL configuration in regard to the primary cell is different from the configuration value of the first uplink reference UL-DL configuration in regard to the secondary cell, the configuration value of the corresponding second uplink reference UL-DL configuration is used in each of two serving cells to decide correspondence between the subframe in which the PDCCH/EPDCCH/PHICH is arranged and the subframe in which the PUSCH corresponding to the PDCCH/EPDCCH/PHICH is arranged.

FIG. 18 is a diagram illustrating correspondence between subframe n in which PDCCH/EPDCCH/PHICH is arranged and subframe n+k in which a PUSCH corresponding to PDCCH/EPDCCH/PHICH is arranged according to the embodiment. The mobile station device 1 specifies (selects or decides) a value of k according to the table of FIG. 18.

In the example of FIG. 18, in a case in which one primary cell is configured or a case in which one primary cell and one secondary cell are configured and the configuration value of the first uplink reference UL-DL configuration in regard to the primary cell is the same value as the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the first uplink reference UL-DL configuration at the time of the uplink-downlink configuration.

In the example of FIG. 18, in a case in which one primary cell and one secondary cell are configured and the configuration value of the first uplink reference UL-DL configuration in regard to the primary cell is different from the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the second uplink reference UL-DL configuration at the time of the uplink-downlink configuration.

Hereinafter, in the description of FIG. 18, the first uplink reference UL-DL configuration and the second uplink reference UL-DL configuration are simply referred to as the uplink-downlink configuration.

In a case in which the PDCCH/EPDCCH accompanied with the uplink grant in which the mobile station device 1 is a target is detected in correspondence with the serving cell in which one of "1" to "6" is set as the configuration value of the uplink-downlink configurations in subframe n, the mobile station device 1 performs the PUSCH transmission according to the uplink grant in subframe n+k specified (selected or decided) based on the table of FIG. 18.

In a case in which the PHICH accompanied with the NACK in which the mobile station device 1 is a target is detected in correspondence with the serving cell in which one of 1 to 6 is set as the configuration value of the uplink-downlink configurations in subframe n, the mobile station device 1 performs the PUSCH transmission in subframe n+k specified (selected or decided) based on the table of FIG. 18.

The uplink grant in which the mobile station device 1 is a target includes a 2-bit uplink index (UL index) in correspondence with the serving cell in which "0" is configured as the configuration value of the uplink-downlink configuration. The uplink grant in which the mobile station device 1 is a target does not include an uplink index (UL index) in correspondence with the serving cell in which one value of "1" to "6" is configured as the configuration value of the uplink-downlink configuration.

In a case in which "1" is set as the most significant bit (MSB) of the uplink index included in the uplink grant corresponding to the serving cell in which "0" is set as the configuration value of the uplink-downlink configuration in subframe n, the mobile station device 1 adjusts the PUSCH transmission according to the uplink grant in subframe n+k specified (selected or decided) based on the table of FIG. 18.

In a case in which the PHICH accompanied with the NACK corresponding to the serving cell in which "0" is set as the configuration value of the uplink-downlink configuration in the first resource set in subframe n (where n=0 or 5) is received, the mobile station device 1 adjusts the PUSCH transmission according to the PHICH in subframe n+k specified (selected or decided) based on the table of FIG. 18.

In a case in which "1" is set as the least significant bit (LSB) of the uplink index included in the uplink grant corresponding to the serving cell in which "0" is set as the configuration value of the uplink-downlink configuration in subframe n, the mobile station device 1 adjusts the PUSCH transmission according to the uplink grant in subframe n+7.

In a case in which the PHICH accompanied with the NACK corresponding to the serving cell in which "0" is set as the configuration value of the uplink-downlink configuration in the second resource set in subframe n (where n=0 or 5) is received, the mobile station device 1 adjusts the PUSCH transmission according to the uplink grant in subframe n+7.

In a case in which the PHICH accompanied with the NACK corresponding to the serving cell in which "0" is set as the configuration value of the uplink-downlink configuration set in subframe n (where n=1 or 6) is received, the mobile station device 1 adjusts the PUSCH transmission according to the uplink grant in subframe n+7.

For example, in a case in which the PDCCH/EPDCCH/PHICH corresponding to the serving cell in which "0" is set as the configuration value of the uplink-downlink configuration is detected in subframe 1 (where SFN=m of the radio frame to which subframe 1 belongs), the mobile station device 1 adjusts the PUSCH transmission in subframe 7 (where SFN=m of the radio frame belonging to subframe 7) after 6 subframes.

The configuration value of the first uplink reference UL-DL configuration and the configuration value of the second uplink reference UL-DL configuration are used to specify (select or decide) correspondence between subframe n in which the PHICH is arranged and subframe n−k in which the PUSCH corresponding to the PHICH is arranged.

In a case in which one primary cell is configured or a case in which one primary cell and one secondary cell are configured and the configuration value of the first uplink reference UL-DL configuration in regard to the primary cell is the same value as the configuration value of the first uplink reference UL-DL configuration in regard to the secondary cell, the configuration value of the corresponding first uplink reference UL-DL configuration is used in each of two serving cells to specify (select or decide) the correspondence between subframe n in which the PHICH is arranged and subframe n−k in which the PUSCH corresponding to the PHICH is arranged.

In a case in which one primary cell and one secondary cell are configured and the first uplink reference UL-DL configuration in regard to the primary cell is different from the first uplink reference UL-DL configuration in regard to the secondary cell, the configuration value of the corresponding second uplink reference UL-DL configuration is used in each of two serving cells to specify (select or decide) the correspondence between subframe n in which the PHICH is arranged and subframe n−k in which the PUSCH corresponding to the PHICH is arranged.

FIG. 19 is a diagram illustrating correspondence between subframe n in which a PHICH is arranged and subframe n−k in which a PUSCH corresponding to the PHICH is arranged according to the embodiment. The mobile station device 1 specifies (selects or decides) a value of k in accordance with the table of FIG. 19.

In the example of FIG. 19, in a case in which one primary cell is configured or a case in which one primary cell and one secondary cell are configured and the configuration value of the first uplink reference UL-DL configuration in regard to the primary cell is the same value as the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the first uplink reference UL-DL configuration at the time of the uplink-downlink configuration.

In the example of FIG. 19, in a case in which one primary cell and one secondary cell are configured and the configuration value of the first uplink reference UL-DL configuration in regard to the primary cell is different from the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the second uplink reference UL-DL configuration at the time of the uplink-downlink configuration.

Hereinafter, in the description of FIG. 19, the first uplink reference UL-DL configuration and the second uplink reference UL-DL configuration are simply referred to as the uplink-downlink configuration.

In regard to a serving cell in which one of "1" to "6" is set as the configuration value of the uplink-downlink configurations, the HARQ indicator (HARQ-ACK) received via the PHICH corresponding to the serving cell in subframe n is related to the PUSCH transmission in subframe n−k specified based on the table of FIG. 19.

In regard to a serving cell in which "0" is set as the configuration value of the uplink-downlink configuration, the HARQ indicator (HARQ-ACK) received via the PHICH corresponding to the serving cell in the first resource set of subframe n (where n=0 or 5) or in subframe n (where n=1 or 6) is related to the PUSCH transmission in subframe n−k specified based on the table of FIG. 19.

In regard to a serving cell in which "0" is set as the configuration value of the uplink-downlink configuration, the HARQ indicator (HARQ-ACK) received via the PHICH corresponding to the serving cell in the second resource set of subframe n (where n=0 or 5) is related to the PUSCH transmission in subframe n−6.

For example, in regard to a serving cell in which "1" is set as the configuration value of the uplink-downlink configuration, the HARQ indicator (HARQ-ACK) received via the PHICH in subframe 1 (where SFN=m of the radio frame to which subframe 1 belongs) is related to the PUSCH transmission in subframe 7 (where SFN=m−1 of the radio frame to which subframe 7 belongs) before 4 subframes.

The configuration value of the first uplink reference UL-DL configuration and the configuration value of the second uplink reference UL-DL configuration are used to specify (select or decide) the correspondence between subframe n in which the PUSCH is arranged and subframe n+k in which the PHICH corresponding to the PUSCH is arranged.

In a case in which one primary cell is set or a case in which one primary cell and one secondary cell are configured and the configuration value of the first uplink reference UL-DL configuration in regard to the primary cell is the configuration value of the first uplink reference UL-DL configuration in regard to the secondary cell, the configuration value of the corresponding first uplink reference UL-DL configuration is used in each of two serving cells to specify (select or decide) the correspondence between subframe n in which the PUSCH is arranged and subframe n+k in which the PHICH corresponding to the PUSCH is arranged.

In a case in which one primary cell and one secondary cell are configured and the configuration value of the first uplink reference UL-DL configuration in regard to the primary cell is different from the configuration value of the first uplink reference UL-DL configuration in regard to the secondary cell, the configuration value of the corresponding second uplink reference UL-DL configuration is used in each of two serving cells to specify (select or decide) the correspondence between subframe n in which the PUSCH is arranged and subframe n+k in which the PHICH corresponding to the PUSCH is arranged.

FIG. 20 is a diagram illustrating correspondence between subframe n in which a PUSCH is arranged and subframe n+k in which a PHICH corresponding to the PUSCH is arranged according to the embodiment. The mobile station device 1 specifies (selects or decides) a value of k in accordance with the table of FIG. 20.

In the example of FIG. 20, in a case in which one primary cell is configured or a case in which one primary cell and one secondary cell are configured and the configuration value of the first uplink reference UL-DL configuration in regard to the primary cell is the same value as the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the first uplink reference UL-DL configuration at the time of the uplink-downlink configuration.

In the example of FIG. 20, in a case in which one primary cell and one secondary cell are configured and the configuration value of the first uplink reference UL-DL configuration in regard to the primary cell is different from the configuration value of the first uplink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the second uplink reference UL-DL configuration at the time of the uplink-downlink configuration.

Hereinafter, in the description of FIG. 20, the first uplink reference UL-DL configuration and the second uplink reference UL-DL configuration are simply referred to as the uplink-downlink configuration.

In a case in which the PUSCH transmission in subframe n is scheduled, the mobile station device 1 decides the PHICH resources in subframe n+k specified from the table of FIG. 20.

For example, in a case in which the PUSCH transmission in subframe 2 (where SFN=m of the radio frame to which subframe 2 belongs) is scheduled in regard to the serving cell in which "0" is set as the configuration value of the uplink-downlink configuration, the PHICH resources in subframe 6 (where SFN=m of the radio frame to which subframe 6 belongs) are decided.

Hereinafter, the first downlink reference UL-DL configuration and the second downlink reference UL-DL configuration will be described in detail.

The configuration value of the first downlink reference UL-DL configuration and the configuration value of the second downlink reference UL-DL configuration are used to specify (select or decide) the correspondence between subframe n in which the PDSCH is arranged and subframe n+k with which the HARQ-ACK corresponding to the PDSCH is transmitted.

In a case in which one primary cell is configured or a case in which one primary cell and one secondary cell are configured and the configuration value of the first downlink reference UL-DL configuration in regard to the primary cell is the same value as the configuration value of the first downlink reference UL-DL configuration in regard to the secondary cell, the configuration value of the corresponding first downlink reference UL-DL configuration is used in each of two serving cells to specify (select or decide) the correspondence between subframe n in which the PDSCH is arranged and subframe n+k with which the HARQ-ACK corresponding to the PDSCH is transmitted.

In a case in which one primary cell and one secondary cell are configured and the configuration value of the first downlink reference UL-DL configuration in regard to the primary cell is different from the configuration value of the first downlink reference UL-DL configuration in regard to the secondary cell, the configuration value of the corresponding second downlink reference UL-DL configuration is used in each of two serving cells to specify (select or decide) the correspondence between subframe n in which the PDSCH is arranged and subframe n+k with which the HARQ-ACK corresponding to the PDSCH is transmitted.

FIG. 21 is a diagram illustrating correspondence between subframe nk in which a PDSCH is arranged and subframe n in which an HARQ-ACK corresponding to the PDSCH is transmitted according to the embodiment. The mobile station device 1 specifies (selects or decides) the value of k according to the table of FIG. 21.

In the example of FIG. 21, in a case in which one primary cell is configured or when a case in which one primary cell and one secondary cell are configured and the configuration value of the first downlink reference UL-DL configuration in regard to the primary cell is the same value as the configuration value of the first downlink reference UL-DL configuration in regard to the secondary cell, the first downlink reference UL-DL configuration is referred to in the uplink-downlink configuration.

In the example of FIG. 21, in a case in which one primary cell and one secondary cell are configured and the first downlink reference UL-DL configuration in regard to the primary cell is different from the first downlink reference UL-DL configuration in regard to the secondary cell, the mobile station device 1 sets the configuration value of the uplink-downlink configuration so that the configuration value of the uplink-downlink configuration is the same value as the referred configuration value with reference to the configuration value of the second downlink reference UL-DL configuration at the time of the uplink-downlink configuration.

Hereinafter, in the description of FIG. 21, the first downlink reference UL-DL configuration and the second downlink reference UL-DL configuration are simply referred to as the uplink-downlink configuration.

In a case in which PDSCH transmission in which the mobile station device 1 is a target is detected and the corresponding HARQ-ACK is to be transmitted in subframe n−k (where k is specified in accordance with the table of FIG. 21) of the serving cell, the mobile station device 1 transmits the HARQ-ACK in subframe n.

For example, the mobile station device 1 does not respond to the HARQ-ACK for the PDSCH transmission used to transmit system information. For example, the mobile station device 1 responds to the HARQ-ACK for the PDSCH transmission scheduled in accordance with the DCI format accompanied with the CRC scrambled with the C-RNTI.

For example, the mobile station device 1 transmits the HARQ-ACK for the PDSCH received in subframe n−6 and/or n−7 in the serving cell in which "1" is set as the configuration value of the uplink-downlink configuration in subframe n (where n=2).

In the serving cell in which the second information is not received, the first downlink reference UL-DL configuration may not be defined. In this case, the mobile station device 1 and the base station device 3 may perform a process to be performed based on the above-described first downlink reference UL-DL configuration based on the first uplink reference UL-DL configuration (serving cell UL-DL configuration). The serving cell in which the second information is not received is a serving cell in which the dynamic TDD is not configured.

For example, in a case in which one primary cell and one secondary cell are configured, the second information in regard to the primary cell is not received, the second information in regard to the secondary cell is received, and the configuration value of the first uplink reference UL-DL configuration (serving cell UL-DL configuration) in regard to the primary cell is different from the configuration value of the first downlink reference UL-DL configuration in regard to the secondary cell, and the serving cell is the secondary cell, the mobile station device 1 may set the configuration value of the second downlink reference UL-DL configuration in regard to the serving cell (the secondary cell) as follows. That is, the mobile station device 1 may set the configuration value of the second downlink reference UL-DL configuration in regard to the serving cell (the secondary cell) based on the pair formed by the configuration value of the first uplink reference UL-DL configuration in regard to the other serving cell (the primary cell) and the configuration value of the first downlink reference UL-DL configuration in regard to the serving cell (the secondary cell).

For example, in a case in which one primary cell and one secondary cell are configured, the second information in regard to the primary cell is not received, the second information in regard to the secondary cell is received, and the configuration value of the first uplink reference UL-DL configuration (serving cell UL-DL configuration) in regard to the primary cell is different from the configuration value of the first downlink reference UL-DL configuration in regard to the secondary cell, the mobile station device 1 may uses the configuration value of the corresponding second downlink reference UL-DL configuration in each of two serving cells to specify (select or decide) the correspondence between subframe n in which the PDSCH is arranged and subframe n+k with which the HARQ-ACK corresponding to the PDSCH is transmitted.

For example, in a case in which one primary cell and one secondary cell are configured, the second information in regard to the primary cell is not received, the second information in regard to the secondary cell is received, and the configuration value of the first uplink reference UL-DL configuration (serving cell UL-DL configuration) in regard to the primary cell is the same value as the configuration value of the first downlink reference UL-DL configuration in regard to the secondary cell, the mobile station device 1 may use the configuration value of the corresponding first uplink reference UL-DL configuration (serving cell UL-DL configuration) in the primary cell to specify (select or decide) the correspondence between subframe n in which the PDSCH is arranged and subframe n+k with which the HARQ-ACK corresponding to the PDSCH is transmitted, and may use the configuration value of the corresponding first downlink reference UL-DL configuration in the secondary cell to specify (select or decide) the correspondence between subframe n in which the PDSCH is arranged and subframe n+k with which the HARQ-ACK corresponding to the PDSCH is transmitted.

For example, in a case in which one primary cell and one secondary cell are configured, the second information in regard to the primary cell is not received, the second information in regard to the secondary cell is received, and the configuration value of the first uplink reference UL-DL configuration (serving cell UL-DL configuration) in regard to the primary cell is different from the configuration value of the first downlink reference UL-DL configuration in regard to the secondary cell, the mobile station device 1 sets the configuration value of the primary cell UL-DL configuration so that the configuration value of the primary cell UL-DL configuration is the same value as the referred configuration value with reference to the configuration value of the first uplink reference UL-DL configuration in regard to the primary cell at the time of the primary cell UL-DL configuration in FIGS. 12 and 14.

Hereinafter, the CSI will be described in detail.

The CSI includes a channel quality indicator (CQI), a rank indicator (RI), and a precoding matric indicator (PMI). The CQI expresses a combination of a modulation scheme and a coding ratio in a single transport block transmitted with the PDSCH. The coding ratio can be derived from the amount of resource of the PDSCH and the size of a transport block.

FIG. 22 is a diagram illustrating modulation schemes and coding ratios corresponding to CQI indexes in a table format according to the embodiment. The mobile station device 1 derives (selects) the largest CQI index among one or more CQI indexes satisfying the condition that "a single PDSCH transport block which is transmitted in a group of downlink physical resource blocks called CSI reference resources and is a combination of a modulation scheme and a transport block size corresponding to the CQI index may be received at a transport block error probability not greater than 0.1" from "1" to "15" of the table of FIG. 22. The mobile station device 1 derives (selects) "0" as the CQI index in a case in which the CQI index 1 does not satisfy the foregoing condition.

However, in a case in which a configuration value of the UL-DL configuration of an adjacent cell is different from a configuration value of the UL-DL configuration of the serving cell, an interference state is different for each subframe. Accordingly, in the embodiment, at least two subframe sets are defined and the mobile station device 1 reports channel state information regarding each of at least two subframe sets to the base station device 3. The subframe sets are preferably structured based on the interference state of the subframe.

FIG. 23 is a diagram illustrating examples of the structures of subframe sets according to the embodiment. In FIG. 23, D denotes a downlink subframe, U denotes an uplink subframe, S denotes a special subframe, a denotes a subframe which belongs to a first subframe set, b denotes a subframe which belongs to a second subframe set, and F denotes a first flexible subframe.

In the example of FIG. 23, downlink transmission is performed with subframes {0, 1, 3, 4, 5, 6, 8, 9} of the serving cell. In the example of FIG. 23, downlink transmission is performed with subframes {0, 1, 5, 6, 9} of the adjacent cell and uplink transmission is performed with subframes {3, 4, 8} of the adjacent cell. Thus, in the serving cell, the interference states of subframes {0, 1, 5, 6, 9} are different from the interference states of subframes {3, 4, 8}. Accordingly, in the example of FIG. 23, the first subframe set is formed of subframes {0, 1, 5, 6, 9} and the second subframe set is formed of subframes {3, 4, 8}.

The base station device 3 may transmit information indicating the subframe sets to the mobile station device 1. The mobile station device 1 may configure the subframe sets based on the information.

The subframe sets may be implicitly formed based on the first flexible subframe. For example, the first subframe set may be formed of the first flexible subframe and the second subframe set may be formed of subframes designated as downlink subframes or special subframes in accordance with the first uplink reference UL-DL configuration.

A plurality of CSI processes may be configured in the mobile station device 1. At least two subframe sets may be configured in a single CSI process. In the mobile station device 1, at least two CSI processes may be configured and one subframe set may be configured in each of at least two CSI processes.

The mobile station device 1 may derive the CSI related to each of the plurality of CSI processes and/or the plurality of subframe sets and reports the CSI.

A special subframe including the DwPTS with a length of $7680/(15000 \times 2048)$ seconds or a shorter length may belong to none of the subframe sets.

The CSI is reported periodically or aperiodically. The CSI reported periodically is referred to as a periodic CSI. The CSI reported aperiodically is referred to as an aperiodic CSI.

The resources which can be used for the mobile station device 1 to report the CSI are controlled by the base station device 3.

The mobile station device 1 is configured to feed back the CSI periodically via the PUCCH semi-statically in accordance with a higher layer (the RRC layer). That is, in the mobile station device 1, a subframe for reporting the periodic CSI is configured in accordance with a higher layer (the RRC layer). The mobile station device 1 may be configured to report the periodic CSI for each CSI process and/or each subframe set. That is, the report of the periodic CSI is triggered based on the configuration of the higher layer in regard to the report of the periodic CSI.

The aperiodic CSI is transmitted with the PUSCH. The mobile station device 1 detects an uplink grant in subframe n in the serving cell c. In a case in which the mobile station device 1 is configured to report the CSI using detection of a CSI request field included in the uplink grant as a trigger, the mobile station device 1 reports the aperiodic CSI using the PUSCH scheduled by the uplink grant in subframe n+k in the serving cell c. That is, the mobile station device 1 reports the aperiodic CSI using detection of information (the DCI format) including the CSI request field as a trigger.

Information (a CSI request) indicting whether to instruct the mobile station device 1 to report the aperiodic CSI is mapped to the CSI request field. The information indicates the CSI process and/or the subframe set which is to be reported by the aperiodic CSI. The mobile station device 1 may report the aperiodic CSI related to the CSI process and/or the subframe set indicated by the information.

The mobile station device 1 derives a wideband CQI and a subband CQI. In the frequency domain, the wideband CQI corresponds to all the downlink physical resource blocks and the subband CQI corresponds to some of the downlink physical resource blocks.

Hereinafter, the CSI reference resources will be described.

In the frequency domain, the CSI reference resources are defined by a group of the downlink physical resource blocks corresponding to bands to which the value of the derived CQI is related.

In the time domain, the CSI reference resources are defined by one subframe. In a case in which the CSI is reported with subframe n, the CSI reference resources are defined by subframe $n - n_{CQI\_ref}$.

$n_{CQI\_ref}$ may be the smallest value satisfying the condition that "the terminal device in which the subframe sets are configured regards the subframe $n-n_{CQI\_ref}$ as a valid subframe" and the condition that "$n_{CQI\_ref}$ is 4 or more".

The mobile station device 1 regards the subframe satisfying at least the following conditions as a valid subframe. The UL-DL configuration indicated by the first information is referred to as UL-DL configuration of the serving cell:

condition (X1): the valid subframe is designated as a downlink subframe in accordance with the UL-DL configuration of the serving cell in a period (radio frame) in which the configuration value of the transmission direction UL-DL configuration is not set;

condition (X2): the valid subframe is designated as a downlink subframe in accordance with the transmission direction UL-DL configuration in a period (radio frame) in which the configuration value of the transmission direction UL-DL configuration is set;

condition (X3): the valid subframe is not an MBSFN subframe in the transmission mode other than transmission modes 9 and 10;

condition (X4): the valid subframe does not include the DwPTS field with a length of 7680/(15000×2048) seconds or a shorter length;

condition (X5): the valid subframe does not include a measurement gap configured in the mobile station device 1; and condition (X6): in a case in which the subframe sets are configured in the mobile station device 1, the valid subframe is a component of the subframe set to which the CSI report corresponds.

The downlink subframe in conditions (X1) and (X2) may be a special subframe.

In a case in which a plurality of cells of the other UL-DL configurations are aggregated and the mobile station device 1 does not have capability of performing simultaneous transmission and reception in the aggregated cells, the downlink subframe in the conditions (X1) and (X2) may be a downlink subframe in the primary cell or a special subframe including the DwPTS field with a length greater than 7680/(15000×2048) seconds.

Each of the CSI reference resources related to a certain serving cell belongs to any one of the subframe sets and does not belong to the plurality of subframe sets.

FIG. 24 is a diagram illustrating an example of the CSI reference resources corresponding to the report of the periodic CSI according to the embodiment.

FIG. 25 is a diagram illustrating an example of the CSI reference resources corresponding to the report of the aperiodic CSI according to the embodiment.

In FIGS. 24 and 25, a denotes a subframe belonging to the first subframe set and b denotes a subframe belonging to the second subframe set. In the examples of FIGS. 24 and 25, "0" is set as the configuration value of the uplink reference UL-DL configuration and "2" is set as the configuration value of the downlink reference UL-DL configuration. In the example of FIG. 24, a valid configuration value "1" of the transmission direction UL-DL configuration is detected (set) in radio frame 0 and a valid configuration value of the transmission direction UL-DL configuration is not detected (set) in radio frame 1.

In FIG. 24, a square to which P is affixed indicates a subframe with which the periodic CSI corresponding to the second subframe set is reported and a square to which R is affixed indicates a CSI reference resource corresponding to the report of the periodic CSI.

In FIG. 24, a subframe satisfying the condition that a subframe is located before four or more subframes from a subframe with which the periodic CSI is reported and the condition that a subframe belongs to the second subframe set and satisfying condition (X1) or (X2) is subframe 4 in radio frame 0. That is, in the example of FIG. 24, subframe 4 in radio frame 0 is the CSI reference resource.

In FIG. 25, a square to which G is affixed indicates a subframe in which the uplink grant including a CSI request serving as a trigger of the report of the channel state information corresponding to the second subframe set is detected, a square to which A is affixed indicates a subframe with which the periodic CSI corresponding to the second subframe set is reported, and a square to which R is affixed indicates a CSI reference resource corresponding to the report of the aperiodic CSI.

In the example of FIG. 25, a subframe satisfying the condition that a subframe is located before four subframes from a subframe with which the aperiodic CSI is reported and the condition that a subframe belongs to the second subframe set and satisfying condition (X1) or (X2) is subframe 4 in radio frame 0. That is, in the example of FIG. 25, subframe 4 in radio frame 0 is the CSI reference resource.

In a case in which there is no subframe which is valid as the CSI reference resource, the mobile station device 1 may omit the report of the CSI.

In the case in which there is no subframe which is valid as the CSI reference resource, the mobile station device 1 may report the channel state information indicating the CQI index (for example, CQI index 0) decided in advance in accordance with the specification of LTE or the like.

In a case in which subframe $n-n_{CQI\_ref}$ which is valid as the CSI reference resource is a subframe before subframes n−k−X, the mobile station device 1 may report the channel state information indicating the CQI index (for example, CQI index 0) decided in advance in accordance with the specification of LTE or the like.

That is, in a case in which $n_{CQI\_ref}$ is greater than k+X, the mobile station device 1 in which the configuration value of the downlink reference UL-DL configuration and/or the subframe sets are set may report the channel state information indicating the CQI index (for example, CQI index 0) decided in advance in accordance with the specification of LTE or the like.

The value of X may be decided based on one combination or a plurality of combinations of conditions (Y1) to (Y7) below:

condition (Y1): transmission mode 10 accompanied with a plurality of CSI processes is configured;

condition (Y2): a subframe set related to CSI measurement is configured;

condition (Y3): the downlink reference UL-DL configuration is configured;

condition (Y4): a plurality of serving cells are configured;

condition (Y5): a plurality of serving cells which a frame structure of the TDD are configured;

condition (Y6): a serving cell which is a frame structure of the TDD and a serving cell which is a frame structure of the FDD are simultaneously configured;

condition (Y7): a serving cell which is a frame structure of the TDD and a serving cell which is a frame structure of the FDD are simultaneously configured, and a frame structure of the primary cell is the FDD;

condition (Y8): a serving cell which is a frame structure of the TDD and a serving cell which is a frame structure of the FDD are simultaneously configured, and a frame structure of the primary cell is the TDD;

condition (Y9): the uplink grant for a serving cell is transmitted to another serving cell which is the frame structure of the TDD;

condition (Y10): the uplink grant for a serving cell is transmitted to another serving cell which is the frame structure of the FDD;

condition (Y11): the periodic CSI; and condition (Y12): the aperiodic CSI.

The value of X may be decided for each serving cell. The value of X may be a common value to the plurality of CSI processes in regard to the same serving cell. The value of X may a common value to the plurality of subframe sets in regard to the same serving cell.

For example, in a case in which condition (Y1) is satisfied, X may be infinite.

For example, in a case in which condition (Y2) is not satisfied, X may be 0.

For example, in a case in which condition (Y1) is not satisfied and conditions (Y2) and (Y3) are satisfied, X may be 1 or an integer greater than 1.

For example, in a case in which condition (Y1) is not satisfied and conditions (Y2) and (Y4) are satisfied, X may be 1 or an integer greater than 1.

For example, in a case in which condition (Y1) is not satisfied and conditions (Y2) and (Y5) are satisfied, X may be 1 or an integer greater than 1.

For example, in a case in which condition (Y1) is not satisfied and conditions (Y2) and (Y6) are satisfied, X may be 0 or an integer greater than 0.

For example, in a case in which condition (Y1) is not satisfied and conditions (Y2) and (Y7) are satisfied, X may be 0.

For example, in a case in which condition (Y1) is not satisfied and conditions (Y2) and (Y8) are satisfied, X may be 1 or an integer greater than 1.

For example, in a case in which condition (Y11) is satisfied, X may be infinite.

The mobile station device 1 configured in one transmission mode among transmission modes 1 to 8 performs channel measurement based on the CRS in order to derive the CQI related to the CSI reference resources.

The mobile station device 1 configured in transmission mode 9 or 10 performs channel measurement using the NZP CSI-RS resources corresponding to the CSI processes in order to derive the CQI related to the CSI reference resources. The NZP CSI-RS resource may be configured for each CSI process.

The mobile station device 1 configured in transmission mode 10 performs interference measurement using the CSI-IM resources corresponding to the CSI processes in order to derive the CQI related to the CSI reference resources. In a case in which at least two subframe sets are configured in a single CSI process, the mobile station device 1 configured in transmission mode 10 performs interference measurement using the CSI-IM resources in the subframe set to which the CSI reference resource belongs in order to derive the CQI related to the CSI reference resources.

In LTE, the transmission mode of the mobile station device 1 is controlled by the base station device 3.

In order to derive the CQI index, the mobile station device 1 is designed in consideration of at least the following factors related to the CSI reference resources:

the number of resource elements corresponding to the CRS is the same as that in the non-MBSFN subframe;

the number of OFDM symbols occupied by a control signal including the PDCCH is 3; and in a case in which the NZP CSI-RS is used for the channel measurement, a ratio of PDSCH EPRE to NZP CSI-RS EPRE given by $P_c$ corresponding to the CSI process and/or the subframe set is used.

A ratio of PDSCH EPRE to CRS EPRE given by $P_A$.

In a case in which the CRS is used for the channel measurement, a ratio of PDSCH EPRE to CRS EPRE given by a common $\Delta_{offset}$ to the subframe set and $P_A$ corresponding to the subframe set is used.

The resource element is not used by the synchronization signal, the PBCH, or the EPDCCH.

The CP length of the non-MBSFN subframe.

A redundancy version is 0.

There is no resource element allocated to the NZP CSI-RS and the ZP CSI-RS.

There is no resource element allocated to the PRS.

A PDSCH transmission scheme according to the transmission mode currently configured in the mobile station device 1.

(i) The mobile station device 1 according to the embodiment includes: the configuration unit 1013 that configures a first subframe set, a second subframe set, a first UL-DL configuration (the uplink reference UL-DL configuration), a second UL-DL configuration (the downlink reference UL-DL configuration), and a third UL-DL configuration (the transmission direction UL-DL configuration); the measurement unit 1059 that performs interference measurement and/or channel measurement to calculate channel state information in the first subframe set or the second subframe set to which the channel state information reference resource belongs; and the transmission unit 107 that performs report of periodic channel state information and report of aperiodic channel state information. Subframes which are valid as the channel state information reference resources and corresponding to the report of the periodic channel state information are subframes designated as a downlink subframe and a special subframe in accordance with the first UL-DL configuration in a radio frame in which a valid configuration value of the third UL-DL configuration is not set and are subframes designated as a downlink subframe and a special subframe in accordance with the third UL-DL configuration in a radio frame in which the valid configuration value of the third UL-DL configuration is set. Subframes which correspond to the report of the aperiodic channel state information are valid as the channel state information reference resources are subframes designated as a downlink subframe and a special subframe in accordance with the second UL-DL configuration.

(ii) The measurement unit 1059 according to the embodiment performs the interference measurement and/or the channel measurement to calculate the periodic channel state information and the aperiodic channel state information in the subframes designated as the downlink subframe and the special subframe in accordance with the first UL-DL configuration in the radio frame in which the valid configuration value of the third UL-DL configuration is not set. The measurement unit 1059 according to the embodiment performs the interference measurement and/or the channel measurement to calculate the periodic channel state information and the aperiodic channel state information in the subframes designated as the downlink subframe and the special subframe in accordance with the third UL-DL configuration in the radio frame in which the valid configuration value of the third UL-DL configuration is set.

(iii) The transmission unit 107 according to the embodiment may report channel state information indicating an out-of-range in a case in which subframes which are valid as the channel state information reference resources corresponding to the report of the aperiodic channel state information are subframes designated as uplink subframes in accordance with the second UL-DL configuration and the valid configuration value of the third UL-DL configuration is not set in the channel state information reference resources.

(iv) In the mobile station device 3 according to the embodiment, the transmission unit may omit the report of the channel state information in a case in which the configuration value of the first UL-DL configuration is set, the configuration value of the second UL-DL configuration is not set, there is no valid downlink subframe in regard to the channel state information reference resource. The transmission unit may report channel state information (a CQI index (for example, indicating an out-of-range) decided in advance in accordance with the specification of LTE or the like) in a case in which the configuration value of the first UL-DL configuration and the configuration value of the second UL-DL configuration are set and there is no valid downlink subframe in regard to the channel state information reference resource.

Accordingly, in the radio communication system in which the channel state information is used, the base station device 3 can efficiently communicate with the mobile station device 1.

A program operated in the base station device 3 and the mobile station device 1 according to the invention may be a program (a program causing a computer to function) controlling a central processing unit (CPU) so that the functions of the foregoing embodiment related to the invention are realized. Information handled in these devices is temporarily accumulated in a random access memory (RAM) at the time of processing the information, the information is subsequently stored in any of various read-only memories (ROMs) such as flash ROMs or a hard disk drive (HDD), is read by the CPU, as necessary, and is corrected and written.

Parts of the mobile station device 1 and the base station device 3 according to the above-described embodiment may be realized by a computer. In this case, the parts may be realized by recording a program realizing the control function in a computer-readable recording medium, reading the program recorded in the recording medium to a computer system, and executing the program.

The "computer system" mentioned herein is a computer system internally included in the mobile station device 1 or the base station device 3 and is assumed to include an OS or hardware such as a peripheral device. The "computer-readable recording medium" refers to a portable medium such as a flexible disk, a magneto-optical disc, a ROM, or a CD-ROM or refers to a storage device such as a hard disk internally included in a computer system.

The "computer-readable recording medium" may include a medium that retains a program dynamically in a short time, when a program is transmitted via a network such as the Internet or a communication line such as a telephone line and a medium that retains a program for a given time, such as a volatile memory inside a computer system serving as a server or a client in this case. The program may be a program that realizes some of the above-described functions or may be a program that can realize the above-described functions in a combination with a program already recorded in a computer system.

The base station device 3 according to the above-described embodiment can be realized as a collective (device group) formed by a plurality of devices. Each of the devices forming the device group may include some or all of the functions or the function blocks of the base station device 3 according to the above-described embodiment. Each device may have each of the general functions or each of the function blocks of the base station device 3 as the device group. The mobile station device 1 according to the above-described embodiment can also communicate with base station devices serving as a collective.

The base station device 3 according to the above-described embodiment may be an Evolved Universal Terrestrial Radio Access Network (EUTRAN). The base station device 3 according to the above-described embodiment may have some or all of the functions of a higher node of an eNodeB.

Parts or all of the mobile station device 1 and the base station device 3 according to the above-described embodiment may be realized as an LSI which is typically an integrated circuit or may be realized as a chip set. The function blocks of the mobile station device 1 and the base station device 3 may be individually realized as chips, or some or all of the function blocks may be integrated to be realized as chips. A method of realizing an integrated circuit is not limited to an LSI, but may be realized as a dedicated circuit or a general-purpose processor. When a technology for realizing an integrated circuit substituted with an LSI with an advance in a semiconductor technology appears, an integrated circuit realized by the technology can also be used.

In the above-described embodiment, the mobile station device has been described as examples of the terminal device or the communication device, but the present invention is not limited thereto. The present invention can also be applied to stationary or non-portable electronic devices installed indoors or outdoors, for example, terminal devices or communication devices such as AV devices, kitchen devices, cleaning and washing devices, air conditioners, office devices, automatic vending machines, or other life appliances.

The embodiments of the present invention have been described above in detail with reference to the drawings, but specific configurations are not limited to the embodiments and include design configurations or the like within the scope of the present invention without departing from the gist of the present invention. The present invention can be modified in various ways within the scope described in the claims and embodiments obtained by appropriately combining the technical means disclosed in other embodiments are also included in the technical range of the invention. Configurations in which elements described in the embodiments and having the same advantages are substituted with each other are also included.

REFERENCE SIGNS LIST 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SUBFRAME CONFIGURATION UNIT
1015 SCHEDULING INFORMATION ANALYSIS UNIT

1017 CSI REPORT CONTROL UNIT
3011 RADIO RESOURCE CONTROL UNIT
3013 SUBFRAME CONFIGURATION UNIT
3015 SCHEDULING UNIT
3017 CSI REPORT CONTROL UNIT

The invention claimed is:

1. A terminal device comprising:
reception circuitry that receives a signal of a higher layer including first information used to instruct two subframe sets and receives downlink control information including information for requesting report of channel state information regarding one subframe set of the two subframe sets; and
transmission circuitry that reports the channel state information derived with reference to a channel state information reference resource using subframe n, wherein
the channel state information reference resource is defined by one downlink subframe $n-n_{CQI\_ref}$ or one special subframe $n-n_{CQI\_ref}$ on a time domain,
in a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received,
in a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4,
in a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe, and
the channel state information reference resource belongs to one of the two subframe sets, but not to both of the two subframe sets.

2. The terminal device according to claim 1, wherein the valid downlink subframe or the special subframe corresponds to the one subframe set.

3. The terminal device according to claim 1, wherein UL-DL configuration used to assign reference UL-DL configuration at a downlink HARQ timing is performed.

4. A communication method for a terminal device, the method comprising:
receiving a signal of a higher layer including first information used to instruct two subframe sets and receiving downlink control information including information for requesting report of channel state information regarding one subframe set of the two subframe sets; and
reporting the channel state information derived with reference to a channel state information reference resource using subframe n, wherein
the channel state information reference resource is defined by one downlink subframe $n-n_{CQI\_ref}$ or one special subframe $n-n_{CQI\_ref}$ on a time domain,
in a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received,
in a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4,
in a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe, and
the channel state information reference resource belongs to one of the two subframe sets, but not to both of the two subframe sets.

5. The communication method according to claim 4, wherein the valid downlink subframe or the special subframe corresponds to the one subframe set.

6. The communication method according to claim 4, wherein UL-DL configuration used to assign reference UL-DL configuration at a downlink HARQ timing is performed.

7. An integrated circuit mounted on a terminal device and causing the terminal device to perform:
a function of receiving a signal of a higher layer including first information used to instruct two subframe sets and receiving downlink control information including information for requesting report of channel state information regarding one subframe set of the two subframe sets; and
a function of reporting the channel state information derived with reference to a channel state information reference resource using subframe n, wherein
the channel state information reference resource is defined by one downlink subframe $n-n_{CQI\_ref}$ or one special subframe $n-n_{CQI\_ref}$ on a time domain,
in a case in which the two subframe sets are not configured, $n_{CQI\_ref}$ is a value in which the channel state information reference resource is present in a valid downlink subframe or a valid special subframe which is the same as a downlink subframe or a special subframe with which the information included in the downlink control information is received,
in a case in which downlink subframe n−4 or special subframe n−4 in which the two subframe sets are configured and with which the information included in the downlink control information is received corresponds to a valid downlink subframe or a valid special subframe, $n_{CQI\_ref}$ is 4,
in a case in which the downlink subframe n−4 or the special subframe n−4 in which the two subframe sets are configured and with which the information included in the downlink control information is received does not correspond to the valid downlink subframe or the valid special subframe, $n_{CQI\_ref}$ is a value greater than 4 in which the channel state information reference resource is present in the valid downlink subframe or the valid special subframe, and the channel state information reference resource belongs to one of the two subframe sets, but not to both of the two subframe sets.

8. The integrated circuit according to claim 7, wherein the valid downlink subframe or the special subframe corresponds to the one subframe set.

9. The integrated circuit according to claim 7, wherein UL-DL configuration used to assign reference UL-DL configuration at a downlink HARQ timing is performed.

* * * * *